US011214899B2

(12) United States Patent
Lonati et al.

(10) Patent No.: US 11,214,899 B2
(45) Date of Patent: Jan. 4, 2022

(54) CIRCULAR KNITTING MACHINE AND A METHOD FOR MOVING THE NEEDLES OF A CIRCULAR KNITTING MACHINE

(71) Applicant: SANTONI S.P.A., Brescia (IT)

(72) Inventors: Andrea Lonati, Brescia (IT); Mauro Alghisi, Brescia (IT); Maurizio Lodrini, Brescia (IT)

(73) Assignee: SANTONI S.P.A., Brescia (IT)

( * ) Notice: Subject to any disclaimer, the term of this patent is extended or adjusted under 35 U.S.C. 154(b) by 118 days.

(21) Appl. No.: 16/608,052

(22) PCT Filed: Mar. 27, 2018

(86) PCT No.: PCT/IB2018/052073
§ 371 (c)(1),
(2) Date: Oct. 24, 2019

(87) PCT Pub. No.: WO2018/197971
PCT Pub. Date: Nov. 1, 2018

(65) Prior Publication Data
US 2020/0199794 A1 Jun. 25, 2020

(30) Foreign Application Priority Data
Apr. 24, 2017 (IT) .......................... 102017000044770

(51) Int. Cl.
*D04B 15/32* (2006.01)
*D04B 9/02* (2006.01)

(52) U.S. Cl.
CPC ............... *D04B 15/32* (2013.01); *D04B 9/02* (2013.01)

(58) Field of Classification Search
CPC ... D04B 9/06; D04B 9/20; D04B 9/36; D04B 9/38; D04B 9/56; D04B 15/14; D04B 15/322; D04B 15/32; D04B 15/68
See application file for complete search history.

(56) References Cited

U.S. PATENT DOCUMENTS 3,097,510 A * 7/1963 Brown ................... D04B 15/68
66/49
3,181,940 A * 5/1965 Tenconi .................. D04B 9/46
66/49
(Continued)

FOREIGN PATENT DOCUMENTS

| EP | 0 962 569 A2 | 12/1999 |
| WO | 2004/097092 A1 | 11/2004 |
| WO | 2004/097094 A1 | 11/2004 |

OTHER PUBLICATIONS

May 18, 2018 International Search Report issued in International Patent Application No. PCT/IB2018/052073.
(Continued)

*Primary Examiner* — Danny Worrell
*Assistant Examiner* — Aiying Zhao
(74) *Attorney, Agent, or Firm* — MH2 Technology Law Group LLP

(57) ABSTRACT

A circular knitting machine includes a needle-holding cylinder having plurality of longitudinal grooves housing plurality of needles, at least one yarn feed operatively associated to needles, actuating cams arranged around and movable relative to cylinder, drive chain for each needle operatively placed between needle and actuating cams. Drive chain includes: sub-needle, selector having butt which can be engaged with selector paths, selecting device acting, punch equipped with butt which can be engaged with punch paths. Punch paths include a tuck stitch ascent and drop stitch ascent for each yarn feed. Inlet of drop stitch ascent circumferentially precedes inlet of tuck stitch ascent. Selector paths include a single track defining first and second ascents placed in succession for each yarn feed. First ascent circumferentially precedes second and is operatively asso- (Continued)

ciated to drop stitch ascent and second ascent is operatively associated to tuck stitch ascent.

20 Claims, 14 Drawing Sheets

(56) References Cited

U.S. PATENT DOCUMENTS

| | | | | | |
|---|---|---|---|---|---|
| 5,072,603 | A | * | 12/1991 | Tenconi | D04B 15/68 66/222 |
| 5,960,645 | A | * | 10/1999 | Sangiacomo | D04B 15/68 66/13 |
| 6,257,026 | B1 | * | 7/2001 | Ando' | D04B 15/68 66/221 |
| 7,207,196 | B2 | * | 4/2007 | Lonati | D04B 9/38 66/222 |
| 7,392,669 | B2 | * | 7/2008 | Lonati | D04B 9/38 66/57 |
| 8,561,434 | B2 | * | 10/2013 | Busi | D04B 15/32 66/40 |
| 2015/0000348 | A1 | * | 1/2015 | Lonati | A41B 11/00 66/8 |

OTHER PUBLICATIONS

May 18, 2018 Written Opinion of the International Searching Authority issued in International Patent Application No. PCT/IB2018/052073.

* cited by examiner

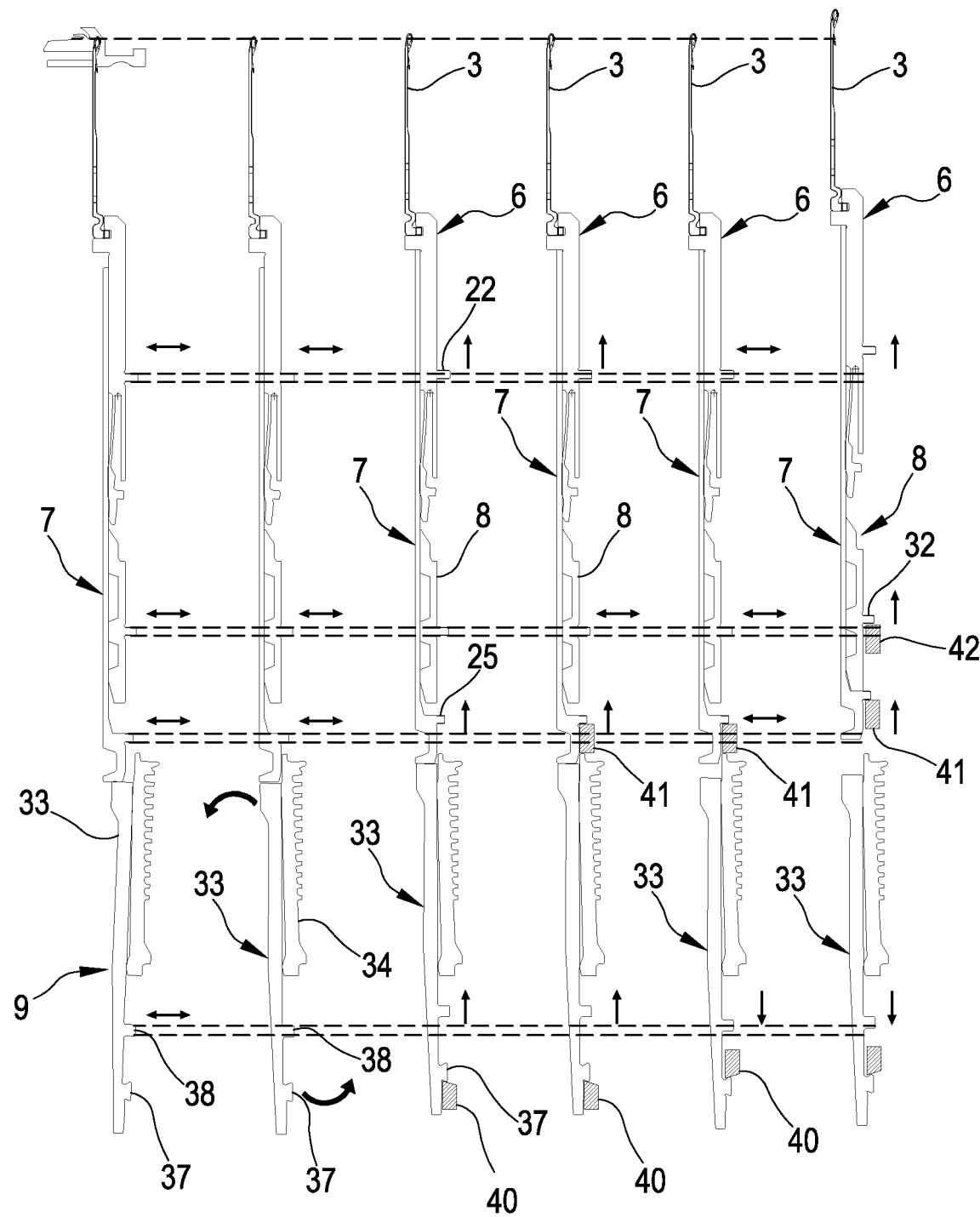

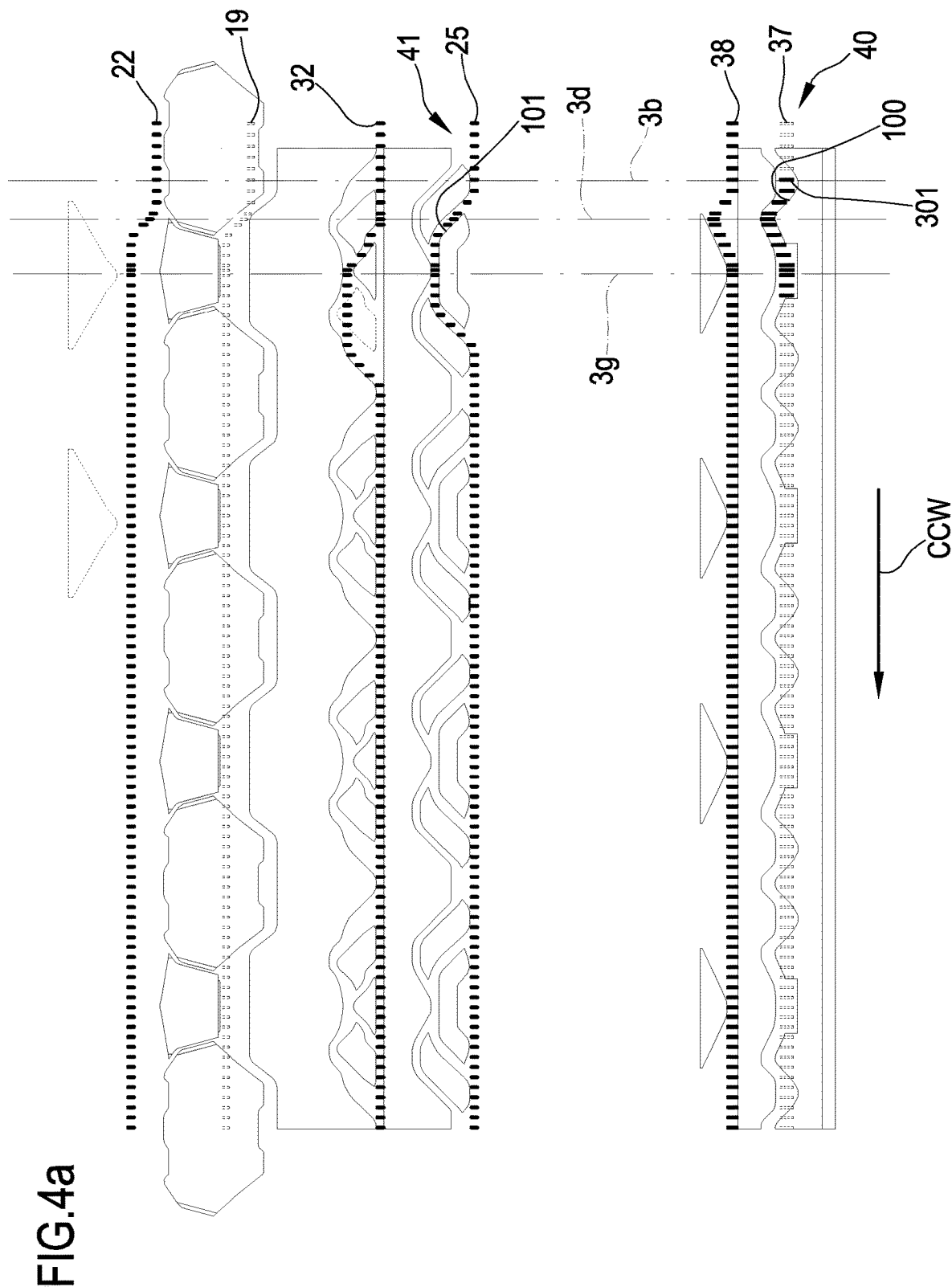

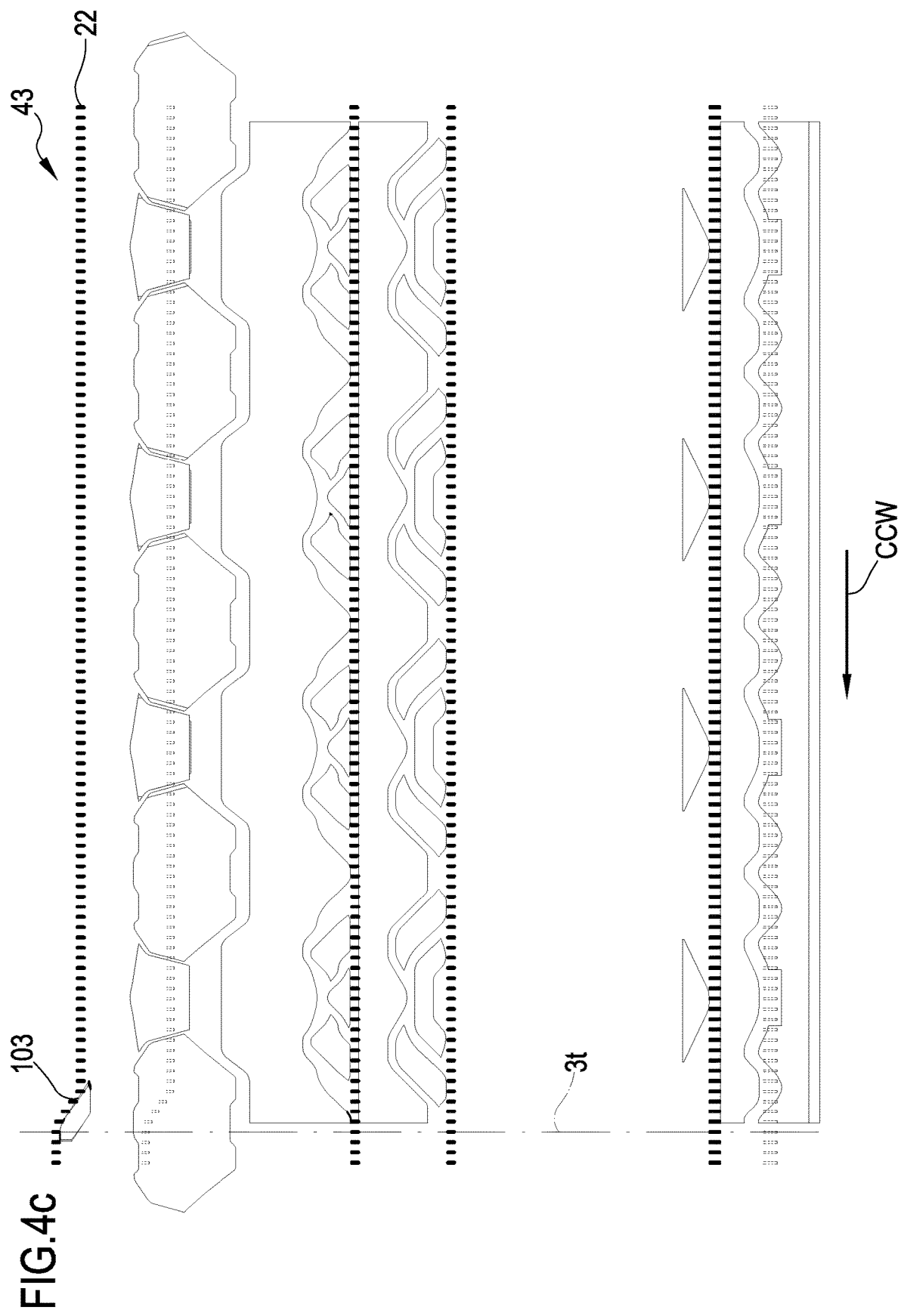

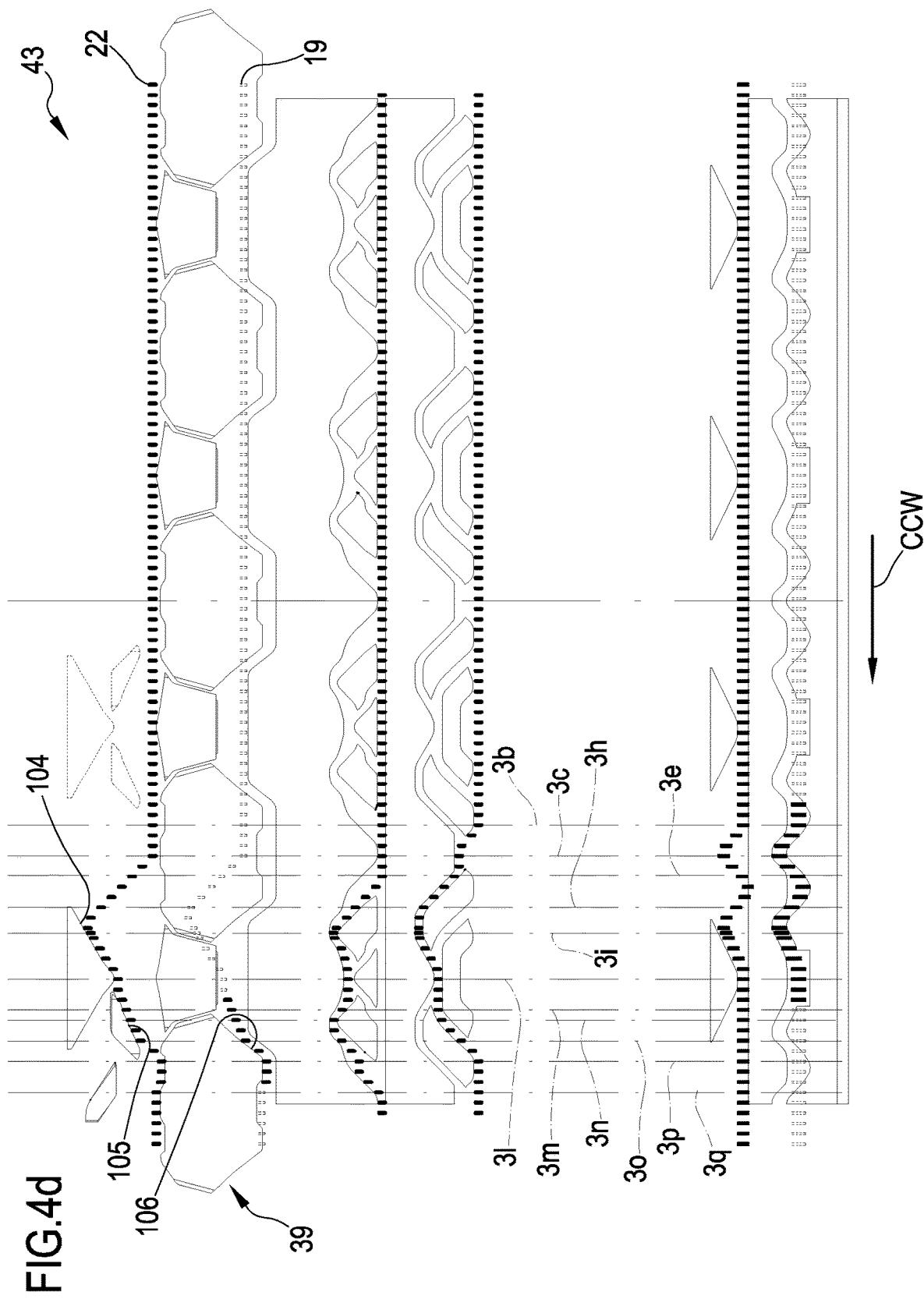

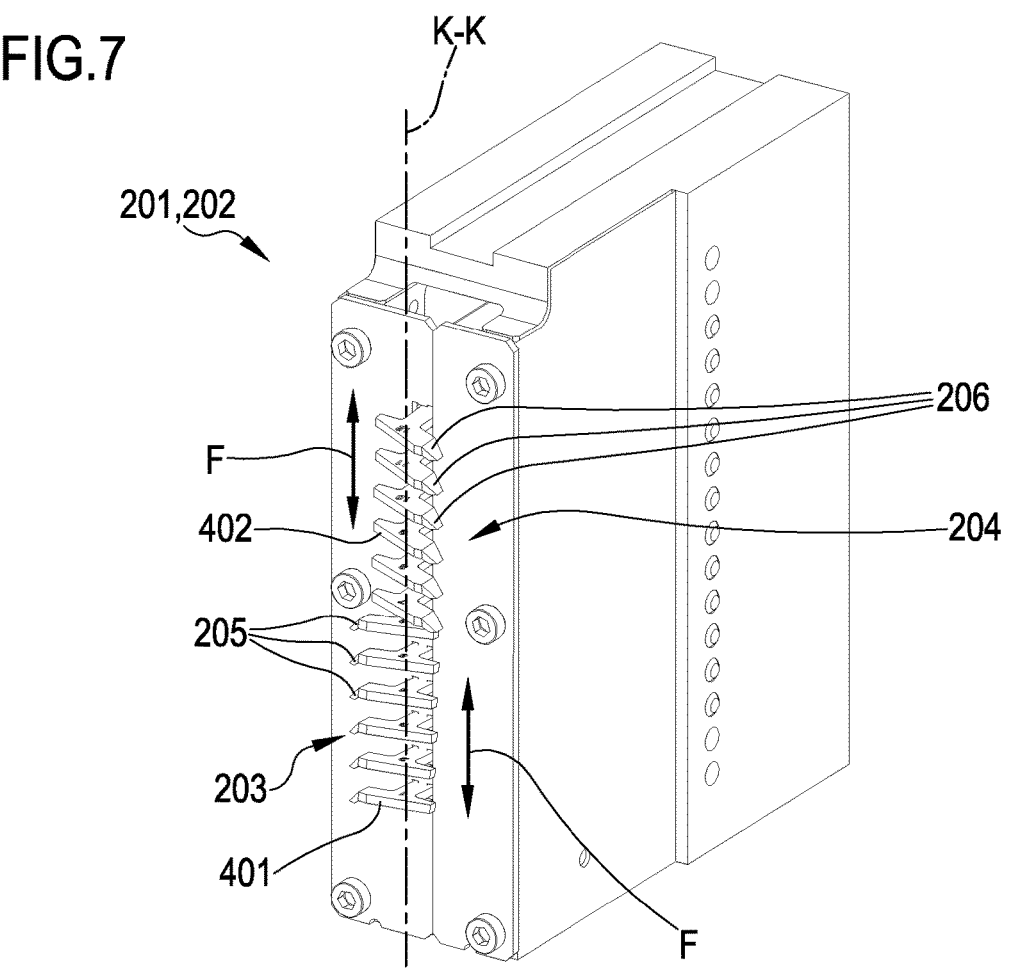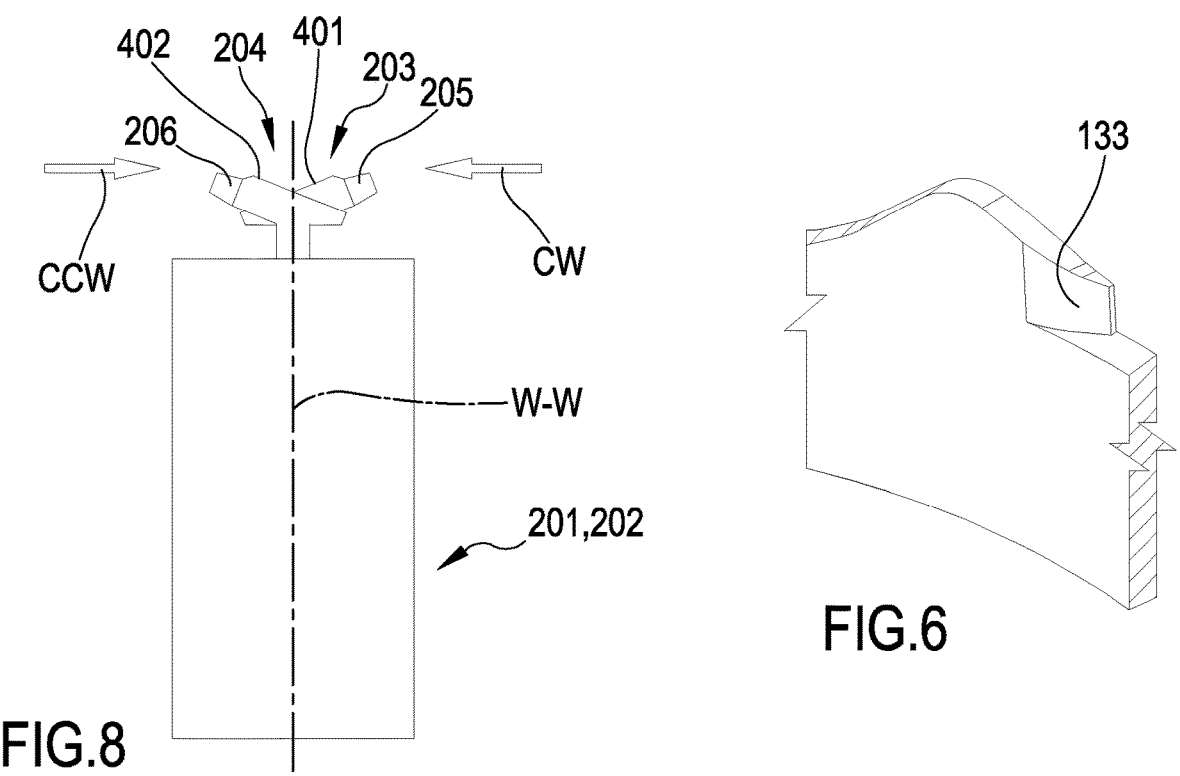

CIRCULAR KNITTING MACHINE AND A METHOD FOR MOVING THE NEEDLES OF A CIRCULAR KNITTING MACHINE

FIELD OF THE INVENTION

The present invention relates to a circular knitting machine and to a method for moving the needles of a circular knitting machine. In particular, the present invention relates to the moving mechanisms for the needles. More particularly, the present invention relates to the structure of the elements actuating the needles by turning the relative rotating movement between the needle-holding element and the actuating cams into given axial movements of the needles.

BACKGROUND OF THE INVENTION

As is known, circular knitting machines comprise a needle-holding element (needle cylinder and/or plate) on which one or more series of needles are arranged along a circular path (circular needlebeds), and devices apt to control the movement of the needles for knitted fabric formation. The devices for controlling the needles of the needle-holding cylinder comprise actuating cams arranged around the cylinder itself, and actuating means configured for operatively connecting the cams to the needles. These actuating means, also defined as "flat parts", are inserted into the grooves of the needles, below the latter, and have butts configured for cooperating with paths delimited by said cams.

It is known to configure the cams and the paths defined by them so that the axial motion of the needles allows to make inactive, tuck and drop stitches.

For instance, public documents EP 1 620 590 and EP 1 620 591, issued to the same Applicant, disclose both a circular knitting machine equipped with a cylinder provided with axial grooves. Each needle of a plurality of needles is housed in one of said axial grooves and actuating means, also placed in the axial grooves, interact with the needles during the rotation of the cylinder so as to cause the actuation thereof. The actuating means of each needle comprise: a sub-needle connected to the respective needle, which can be radially oscillated in the groove so as to selectively engage its own butt with paths defined by actuating cams, a punch having an upper portion which can be engaged with a lower end of the sub-needle, which can also be engaged with respective paths defined by the actuating cams, a selector which can be oscillated in a radial plane, so as to engage into respective paths defined by the actuating cams, and which can be activated by means of selecting devices, wherein the selector has an upper portion which can be engaged against a lower portion of the punch. As can be noted, the path of the oscillating selector has a rising length which lifts said selector and the punch together with the needle as far as a cast-off point of a knitted loop (drop stitch), and a further rising length by means of which the needle is lifted to a smaller extent and the knitted loop is not cast off onto the needle stem (tuck stitch). The tuck stitch rising length lies upstream from the drop stitch rising length. In order to make a drop knitting stitch, the needle selector is retained in or guided into the operating position by means of the selecting devices, so as to engage with a butt thereof first with the tuck stitch rising length and then with the drop stitch rising length. The selector engaged with the tuck stitch rising length lifts the punch, which is then lowered thus causing the sub-needle to momentarily switch into the non-operating position. The further lifting caused by the selector being engaged with the drop stitch rising length caused the needle to be lifted as far as the cast-off point of the knitted loop. In order to make a tuck knitting stitch, the selector is engaged with the tuck stitch rising length only. In this case there is no further lifting.

Public document IT1203500 discloses a machine for knitted or hosiery items comprising a lifting cam which defines two paths for a butt of an elastic jack, which in turn acts upon a sub-needle and upon a needle. These two paths are: a first path for executing normally knitted stitches, and a second path, parallel and lowered with respect to the first one, for executing tuck stitches. Each of said paths comprises a rising length, a basically horizontal length and a sinking length. When executing normally knitted stitches (drop stitches), the butt of the elastic jack engages with the first (upper) path. The needle is lifted to such a height that the previously formed loop is dropped onto the stem of said needle. When executing tuck stitches, the butt of the elastic jack follows the second (lower) path. The needle is lifted to such a height that the previously formed loop is not dropped onto the stem.

SUMMARY

In the framework of circular knitting machines as the ones disclosed above, the Applicant has identified the presence of some drawbacks.

First of all, the Applicant has noted that known machines as described above have large axial and circumferential sizes and these known machines cannot be manufactured with diameters below predefined diameters, since doing so it is not possible to provide known actuating means for the needles with such characteristics as to allow all the movements required for knitting.

The Applicant has further noted that in known solutions, in particular in the case of knitting machines with needle-holding cylinder having a small diameter—e.g. below 10 inches (about 250 mm)—it is not possible to introduce a large number of yarn feeds (e.g. above four) since there is not enough room around the cylinder for housing all necessary actuating means.

The sizes of known machines have a negative impact upon the inertias at stake, which limit the rotational speed and therefore the knitting speed.

The Applicant has further noted that known machines as described above have a limited number of possible movements of the needles, which limits production flexibility.

In particular, the Applicant has noted that in known machines the structure of the cams allowing to make alternatively tuck or drop stitches, is such as to occupy much room along the circumferential development of the cam casing. This involves a limitation of the movements to be assigned to the needles and/or a limitation of the number of yarn feeds for a predefined diameter of the needle-holding cylinder.

The Applicant has noted that these drawbacks are even worse if the circular knitting machine has an alternating oscillatory rotation, i.e. if it works and knits fabric by oscillating (in clockwise and counterclockwise direction) the cylinder with respect to the cam casing around a central axis or axis of rotation.

In particular, the Applicant has noted that the solution of documents EP 1 620 590 and EP 1 620 591 results in that, when executing tuck stitches, the butt of the oscillating selector must necessarily be disengaged from the respective path (i.e. retracted in the cylinder) after the tuck stitch rising length but before the drop stitch rising length, so as not to go over said drop stitch rising length. This means that the room for the selecting devices must be obtained between the two rising lengths, thus increasing the circumferential development of the cams.

In the case of machines with alternating motion, this room is required on both sides of the cam triangle defining the drop stitch rising lengths.

Under these circumstances, an aim underlying the present invention, in its various aspects and/or embodiments, is to propose a circular knitting machine which, the knitting characteristics to be achieved being the same, or even with more knitting characteristics to be achieved with respect to the prior art, has a small size and allows to manufacture fabrics with relatively small diameters, e.g. below 165 mm.

A further aim of the present invention is to propose a circular knitting machine and a method for moving the needles which allow to increase the plurality of movements which can be assigned to the needles so as to achieve a higher production flexibility, i.e. so as to manufacture different types of fabrics with several characteristics differing one from the other.

A further aim of the present invention is to propose a circular knitting machine and a method for moving the needles which allow to increase the number of yarn feeding points, or feeds, to be defined, the diameter of the needle-holding element being the same, with respect to the prior art.

A further aim of the present invention is to provide a circular knitting machine characterized by a simple and rational structure.

A further aim of the present invention is to create alternative solutions to the prior art for carrying out circular knitting machines, and/or to open new design possibilities.

A goal of the present invention is also to obtain the intended aims for circular knitting machines with alternating oscillatory motion.

These and other possible aims, which shall appear better from the following description, are basically achieved by a circular knitting machine and by a method for moving the needles, according to one or more of the appended claims and according to the following aspects and/or embodiments, variously combined, possibly also with the aforesaid claims.

In the present description and in the appended claims, the words "upper", "lower", "above" and "below" relate to the positioning of the machine during normal operation with the central axis of rotation in vertical position and the cylinder needles pointing upwards.

In the present description and in the appended claims, the words "axial", "circumferential", "radial" relate to said central axis.

Some aspects of the invention are listed below.

In one aspect, the invention relates to a circular knitting machine comprising: a basement; a needle-holding cylinder mounted onto the basement and having a plurality of longitudinal grooves arranged around a central axis of the needle-holding cylinder; a plurality of needles, each being housed in a respective longitudinal groove; at least one yarn feed operatively associated to the needles; actuating cams arranged around the needle-holding cylinder and movable with respect to said needle-holding cylinder around the central axis for causing or allowing the movement of the needles along the longitudinal grooves so as to enable stitch formation by said needles; a drive chain for each needle inserted into the respective longitudinal groove, located below the respective needle and operatively placed between the respective needle and said actuating cams.

In one aspect, said drive chain comprises: a sub-needle arranged below the needle and, preferably, slidingly arranged in the respective longitudinal groove.

In one aspect, said drive chain comprises: a selector arranged below the sub-needle, having at least one respective butt radially movable between an operating position, in which it is extracted so as to engage with respective selector paths defined by selector cams, and a non-operating position, in which it is retracted so as not to engage with said selector paths. Preferably, the selector is at least partly slidingly arranged in the respective longitudinal groove.

In one aspect, said machine comprises: at least one selecting device acting under control upon said selector for switching the latter into or retaining it in the operating position or the non-operating position.

In one aspect, said drive chain comprises: a punch arranged between the sub-needle and the selector, wherein a lower portion of the punch is engaged with the selector and an upper portion of the punch is engaged with the sub-needle, wherein the punch has a respective butt which can be engaged with respective punch paths defined by punch cams. Preferably, the punch is slidingly arranged in the respective longitudinal groove.

In one aspect, taking as reference the drive chain rotating with respect to the actuating cams around the central axis in one sense of rotation, the punch paths comprise a tuck stitch ascent and a drop stitch ascent for each yarn feed, and an inlet of the drop stitch ascent circumferentially precedes an inlet of the tuck stitch ascent.

In one aspect, the selector paths comprise a single track defining a first ascent and a second ascent placed in succession one after the other for each yarn feed.

In one aspect, the first ascent circumferentially precedes the second ascent.

In one aspect, the first ascent is "operatively associated" to the drop stitch ascent and the second ascent is operatively associated to the tuck stitch ascent.

"Operatively associated" for the first ascent with reference to the drop stitch ascent and for the second ascent with reference to the tuck stitch ascent, means that the first ascent and the respective drop stitch ascent are near the same straight line parallel to the central axis and lying on a cylindrical surface on which the cams lie, and this also for the second ascent and the respective tuck stitch ascent. In other words, a needle and the respective drive chain, when they are near the first ascent, are also near the respective drop stitch ascent. A needle and the respective drive chain, when they are near the second ascent, are also near the respective tuck stitch ascent. Thus, while the selector of a catenary is engaged with the first ascent, the punch of the same catenary is engaged or is going to be engaged with the drop stitch ascent, and while the selector of a catenary is engaged with the second ascent, the punch of the same catenary is engaged or is going to be engaged with the tuck stitch ascent.

The Applicant has found that the invention allows to solve the problems related to the limitations of the movements of the needles resulting from the size of the machine, and thus to achieve the intended aim.

In particular, the Applicant has found that the invention allows to move the needles so as to make tuck or drop stitches, limiting the circumferential development of the cams dedicated to these movements.

This characteristics allows to provide the needles with more movements with respect to the prior art and/or to reduce the axial and circumferential development of the cylinder and of the cams, the needle movements to be achieved being the same. This allows to manufacture fabrics with smaller diameter and/or with several characteristics differing one from the other and/or to reduce the inertia of the cylinder and thus to increase the working speed.

As a matter of fact, as will be more apparent from the following detailed description, the particular shape of the selector paths, with the second ascent (operatively associated to the tuck stitch ascent) following (i.e. placed downstream from) the first ascent (operatively associated to the drop stitch ascent), and of the punch paths, with the tuck stitch ascent following the drop stitch ascent, allows to force the needles to execute tuck and drop stitches in limited circumferential spaces and in a simpler and faster way.

Further aspects of the invention are listed below.

In one aspect, an inlet of the drop stitch ascent immediately precedes (i.e. is placed immediately upstream from) an inlet of the tuck stitch ascent. By going forward with respect to the cams, each needle and the respective drive chain first meets the inlet of the drop stitch ascent and then the inlet of the tuck stitch ascent. "Immediately precedes" means that there is no further inlet or path for the punch butt between the two aforesaid inlets.

In one aspect, an outlet of the drop stitch ascent immediately precedes (i.e. is placed immediately upstream from) an outlet of the tuck stitch ascent. "Immediately precedes" means that there is no further outlet or path for the punch butt between the two aforesaid outlets.

In one aspect, the yarn feed follows (i.e. is placed downstream from) respective maximum height points of the tuck stitch ascent and of the drop stitch ascent.

In one aspect, the tuck stitch ascent and the drop stitch ascent develop parallel or basically parallel one to the other. Preferably though not necessarily, the drop stitch ascent and the tuck stitch ascent have the same inclination.

In one aspect, the inlet of the drop stitch ascent and the inlet of the tuck stitch ascent branch off from a basic path. Preferably, said basic path is placed at a constant axial height, i.e. it is a circle.

In one aspect, a maximum height of the drop stitch ascent is higher than a maximum height of the tuck stitch ascent.

In one aspect, an axial extension of the drop stitch ascent is longer than an axial extension of the tuck stitch ascent.

In one aspect, a circumferential extension of the drop stitch ascent is longer than a circumferential extension of the tuck stitch ascent.

In one aspect, a length of the drop stitch ascent is longer than a length of the tuck stitch ascent.

In one aspect, the tuck stitch ascent and the drop stitch ascent merge one into the other after (i.e. downstream from) respective maximum height points.

In one aspect, the tuck stitch ascent is part of a tuck stitch punch path and the drop stitch ascent is part of a drop stitch punch path.

In one aspect, said tuck stitch punch path and drop stitch punch path merge after (i.e. downstream from) the respective tuck stitch ascent and drop stitch ascent.

In one aspect, the drop stitch punch path has a basically horizontal length placed after (i.e. downstream from) the drop stitch ascent.

In one aspect the drop stitch punch path has a drop stitch descent connecting the basically horizontal length with an outlet of the tuck stitch ascent.

In one aspect, the punch paths associated to each yarn feed are symmetrical with respect to said yarn feed.

In one aspect, the punch paths comprise a first pair of tuck stitch and drop stitch ascents and a second pair of tuck stitch and drop ascents coupled to each yarn feed.

In one aspect, said first pair and second pair of ascents are arranged symmetrically with respect to said yarn feed.

In one aspect, the tuck stitch and drop stitch ascents of the first and second pair merge into a central area of the punch paths aligned with the respective yarn feed.

In one aspect, the single track has at least one wavy segment with peaks and valleys. In one aspect, said wavy segment comprises the first ascent and the second ascent.

In one aspect, an axial extension of the first ascent is basically the same as an axial extension of the second ascent.

In one aspect, a circumferential extension of the first ascent is basically the same as a circumferential extension of the second ascent.

In one aspect, the first ascent and the second ascent develop basically parallel one to the other.

In one aspect, the drop stitch ascent is circumferentially offset with respect to the respective first ascent.

In one aspect, the tuck stitch ascent is circumferentially offset with respect to the respective second ascent.

In one aspect, the first ascent is circumferentially offset in advance with respect to the respective drop stitch ascent.

In one aspect, a maximum height of the first ascent circumferentially precedes an inlet of the respective drop stitch ascent.

In one aspect, the second ascent is circumferentially offset in advance with respect to the respective tuck stitch ascent.

In one aspect, a base of the second ascent circumferentially precedes an inlet of the respective tuck stitch ascent.

In one aspect, a maximum height of the second ascent circumferentially precedes a maximum height of the respective tuck stitch ascent.

In one aspect, inlet points of the butt of the selector in the wavy segment are defined on valleys of the wavy segment.

In one aspect, the wavy segment comprises a first descent, wherein the first descent connects the first ascent to the second ascent.

In one aspect, the wavy segment comprises a second descent following (i.e. placed downwards from) the second ascent. The butt of the selector can thus slide in the single track passing in a continuous manner over the first ascent, the first descent, the second ascent and the second descent.

In one aspect, inlet points of the butt of the selector in the wavy segment are defined on a base of the first ascent and on a base of the second ascent.

In one aspect, a first inlet point of the butt of the selector in the wavy segment is defined on a base of the first ascent.

In one aspect, a second inlet point of the butt of the selector in the wavy segment is defined on a base of the second ascent.

In one aspect, the single track has a disengaging area for each yarn feed and is configured for enabling the respective butt to radially get out of said single track. As a result, the butt of the axially moving element of the selector gets out of the single track and gets into the longitudinal groove of the needle-holding cylinder housing the drive chain.

In one aspect, the yarn feed lies on the respective disengaging area.

In one aspect, the disengaging area follows (i.e. is placed downstream from) the second descent.

In one aspect, said disengaging area has at least one outlet ramp defined by a chamfer and extending between a bottom surface of the single track and a radially more external surface. The butt of the selector gets forward in the outlet area as far as the outlet ramp and, sliding on said ramp, is then moved radially inwards.

In one aspect, the disengaging area is symmetrical with respect to the respective yarn feed.

In one aspect, the disengaging area has two outlet ramps placed on opposite ends thereof.

In one aspect, the single track comprises a wavy segment arranged on both sides of the disengaging area.

In one aspect, the machine comprises at least two yarn feeds.

In one aspect, the single track comprises a disengaging area associated with each yarn feed and at least two wavy segments, each being placed between two disengaging areas one circumferentially after the other.

In one aspect, the wavy segment is symmetrical with respect to a middle axial straight line located in an intermediate position between two yarn feeds one circumferentially after the other.

In one aspect, the wavy segment comprises a central protrusion preferably symmetrical with respect to the middle axial straight line.

In one aspect, the wavy segment comprises two side protrusions arranged on the sides of the central protrusion, one for each side of the central protrusion.

In one aspect, there are two valleys, each one being defined between the central protrusion and each of the side protrusions.

In one aspect, the central protrusion has two sides, wherein, taking as reference the drive chain rotating with respect to the actuating cams around the central axis in a counterclockwise sense of rotation, a first one of the two sides defines the first ascent and a second one of the two sides defines the first descent, wherein said first ascent and first descent work for a first yarn feed.

In one aspect, taking as reference the drive chain rotating with respect to the actuating cams around the central axis in a clockwise sense of rotation, the second one of the two sides defines the first ascent and the first one of the two sides defines the first descent, wherein said first ascent and first descent work for a second yarn feed adjacent to the first yarn feed.

In one aspect, taking as reference the drive chain rotating with respect to the actuating cams around the central axis in a clockwise sense of rotation, one of the two side protrusions defines the second ascent and the second descent, wherein said second ascent and second descent work for the first yarn feed.

In one aspect, taking as reference the drive chain rotating with respect to the actuating cams around the central axis in a counterclockwise sense of rotation, the other one of the two side protrusions defines the second ascent and the second descent, wherein said second ascent and second descent work for the second yarn feed adjacent to the first yarn feed.

The wavy segment placed between two successive yarn feeds works for the yarn feed following (i.e. arranged downstream from) the wavy segment with respect to the movement of the needles and of the drive chains sliding with respect to the cams thanks to the rotation of the needle-holding cylinder in a predefined sense of rotation. By reversing the sense of rotation and thus the direction of movement of the needles and of the drive chain with respect to the cams, the same wavy segment works for the other yarn feed.

In one aspect, said at least one selecting device is placed between two successive yarn feeds.

In one aspect, the machine comprises at least two yarn feeds and at least two selecting devices, each placed between two successive yarn feeds.

In one aspect, said at least one selecting device is placed on a respective wavy segment.

In one aspect, the selecting device comprises two actuators circumferentially placed one beside the other.

In one aspect, the two actuators are placed between two successive yarn feeds.

In one aspect, each of the actuators is placed on a respective valley (or depression) defined by the wavy segment, preferably between the central protrusion and each of the side protrusions.

In one aspect, the actuator is of magnetic or piezoelectric type.

In one aspect, the actuator is of lever type.

In one aspect, the actuator comprises a plurality of levers.

In one aspect, each lever is movable under control between a first position and a second position, preferably each lever is movable vertically under control between a raised position and a lowered position.

In one aspect, the actuator comprises a plurality of levers, each oscillating under control around a horizontal axis.

In one aspect, the level actuator comprises a first array of levers and a second array of levers.

In one aspect, each array of levers comprises a plurality of levers arranged consecutively one after the other along a common axis, preferably overlapping and aligned along a vertical axis.

In one aspect, the second array of levers and the first array of levers are arranged consecutively one after the other along said common axis, preferably the second array of levers axially overlaps the first array of levers.

In one aspect, the first array of levers is configured for operating, i.e. for engaging with teeth of selectors of the circular knitting machine, if the relative rotation of the needle-holding cylinder with respect to the actuating cams occurs in a first sense of rotation, preferably in counterclockwise sense.

In one aspect, the second array of levers is configured for operating, i.e. for engaging with the teeth of the selectors, if the relative rotation of the needle-holding cylinder with respect to the actuating cams occurs in a second sense of rotation, opposed to the first sense or rotation, preferably in clockwise sense.

In one aspect, taking as reference a plane of symmetry in which the common axis lies, the levers of the first array of levers are asymmetrical with respect to the levers of the second array of levers.

In one aspect, each lever is asymmetrical with respect to a vertical axis.

In one aspect, the levers of the first array of levers are asymmetrical with respect to the levers of the second array of levers.

In one aspect, the levers of the first array of levers all movable together.

In one aspect, the levers of the first array of levers are movable around the respective axes orthogonal to the common axis, preferably around the respective horizontal axes.

In one aspect, the levers of the second array of levers all movable together.

In one aspect, the levers of the second array of levers are movable around the respective axes orthogonal to the common axis, preferably around the respective horizontal axes.

In one aspect, the first array of levers and the second array of levers are movable independently one from the other.

In one aspect, the levers of the first array of levers are movable independently from the levers of the second array of levers.

In one aspect, the levers of the first array of levers have respective first engaging surfaces for the teeth of the selectors.

In one aspect, the levers of the second array of levers have respective second engaging surfaces for the teeth of the selectors.

In one aspect, the first engaging surfaces and the second engaging surfaces are inclined in opposite directions.

In one aspect, the first engaging surfaces lie in a first common plane inclined with respect to the plane of symmetry or in first planes inclined with respect to the plane of symmetry.

In one aspect, the second engaging surfaces lie in a second common plane inclined with respect to said plane of symmetry or in second planes inclined with respect to the plane of symmetry.

In one aspect, the first engaging surfaces and the second engaging surfaces are inclined towards opposite sides of the plane of symmetry.

In one independent aspect, the present invention relates to a lever actuator for circular knitting machines according to one or more of the previous aspects, wherein said actuator can be used in the machine here described and claimed as well as in other circular machines preferably with alternating rotary motion.

In one independent aspect, the present invention also relates to a circular knitting machine, preferably with alternating rotary motion, comprising at least one actuator according to one or more of the previous aspects.

In one independent aspect, the present invention also relates to a circular knitting machine, preferably with alternating rotary motion, comprising: a needle-holding cylinder having a plurality of longitudinal grooves arranged around a central axis of the needle-holding cylinder; a plurality of needles, each being housed in a respective longitudinal groove; at least one yarn feed operatively associated to the needles; actuating cams arranged around the needle-holding cylinder and movable with respect to said needle-holding cylinder around the central axis for causing or allowing the movement of the needles along the longitudinal needle so as to enable stitch formation by said needles; a drive chain for each needle inserted into the respective longitudinal groove, located below the respective needle and operatively placed between the respective needle and said actuating cams;

wherein said drive chain comprises: a selector arranged below the needle, having at least one respective butt radially movable between an operating position, in which it is extracted so as to engage with respective selector paths defined by selector cams, and a non-operating position, in which it is retracted so as not to engage with said selector paths.

In one aspect, said machine comprises: at least one selecting device acting under control upon said selector for switching the latter into or retaining it in the operating position or the non-operating position; wherein the selecting device comprises at least one actuator according to one of the preceding aspects.

In one aspect, the first array of levers of each of the two actuators is configured for engaging with the teeth of the selectors if the relative rotation of the needle-holding cylinder with respect to the actuating cams occurs in the first sense of rotation, preferably in the counterclockwise sense.

In one aspect, the second array of levers of each of the two actuators is configured for engaging with the teeth of the selectors if the relative rotation of the needle-holding cylinder with respect to the actuating cams occurs in the second sense of rotation, opposed to the first sense of rotation, i.e. in the clockwise sense.

The Applicant has found that the actuator according to the invention, which integrates the levers operating both in clockwise and in counterclockwise sense, allows to further reduce machine size, since a smaller space between two yarn feeds is required for installing the actuators acting upon the selectors.

In one aspect, the invention relates to a method for moving the needles of a circular knitting machine, wherein said machine is made according to one or more of the above aspects and/or of the appended claims.

In one aspect, the method comprises: causing a relative rotation between the needle-holding cylinder and the actuating cams.

In one aspect, the method comprises:

engaging the butt of the selector into a first inlet point defined on a base of the first ascent;

lifting the selector by means of said relative rotation and a subsequent sliding of the respective butt on the first ascent;

lifting the punch by means of an axial push upwards made by the selector until the butt of the punch is engaged into the drop stitch ascent;

further lifting the punch by means of said relative rotation and a subsequent sliding of the respective butt on the drop stitch ascent so as to lift the needle and make a drop stitch;

wherein the punch, while being lifted, gets off the selector;

wherein, while the punch is lifted and slides on the drop stitch ascent, the butt of the selector moves in the single track also going over the second ascent.

In one aspect, the method comprises:

engaging the butt of the selector into a second inlet point defined on a base of the second ascent; causing the selector to be lifted by means of said relative rotation and a subsequent sliding of the respective butt on the second ascent;

lifting the punch by means of an axial push upwards made by the selector until the butt of the punch is engaged into the tuck stitch ascent;

causing the punch to be further lifted by means of said relative rotation and a subsequent sliding of the respective butt on the tuck stitch ascent so as to lift the needle and make a tuck stitch.

In one aspect, after going over the second ascent, the butt of the selector goes over a second descent and gets into a disengaging area.

In one aspect, the butt of the selector goes over the disengaging area until it engages an outlet ramp, wherein the outlet ramp causes the respective butt to radially get out of the single track. The butt radially approaches the axis of rotation and gets back into the respective groove of the needle-holding cylinder, which houses the drive chain.

In one aspect, if the needle-holding cylinder rotates in a counterclockwise sense of rotation with respect to the actuating cams, the butt of the selector slides on the first side of the central protrusion so as to lift the punch until the butt of the punch is engaged into the drop stitch ascent related to a first yarn feed, or the butt of the selector slides on a first side of one of the side protrusions so as to lift the punch until the butt of the punch is engaged into the tuck stitch ascent related to the first yarn feed.

In one aspect, if the needle-holding cylinder rotates in a clockwise sense of rotation with respect to the actuating cams, the butt of the selector slides on the second side of the central protrusion so as to lift the punch until the butt of the punch is engaged into the drop stitch ascent related to a second yarn feed, or the butt of the selector slides on a second side of another one of the side protrusions so as to lift the punch until the butt of the punch is engaged into the tuck stitch ascent related to the second yarn feed.

In one aspect, the method comprises: acting upon the selectors by means of the selecting device so as to move the respective butts or retain them in the operating position or the non-operating position.

In one aspect, if the relative rotation of the needle-holding cylinder with respect to the actuating cams occurs in the first sense of rotation, preferably counterclockwise, the first array of levers of said at least one actuator engages with the teeth of the selectors.

In one aspect, if the relative rotation of the needle-holding cylinder with respect to the actuating cams occurs in the second sense of rotation opposed to the first sense of rotation, i.e. preferably clockwise, the second array of levers of said at least one actuator engages with the teeth of the selectors.

In one aspect, if the needle-holding cylinder rotates in a first sense of rotation, preferably counterclockwise, with respect to the actuating cams, a first actuator acts upon the selectors for engaging the butts into the first inlet point and making drop stitches on a yarn feed, and a second actuator acts upon the selectors for engaging the butts, previously not engaged by the first actuator, into the second inlet point and making tuck stitches on said yarn feed.

In one aspect, if the needle-holding cylinder rotates in a first sense of rotation, preferably counterclockwise, with respect to the actuating cams, a first array of levers of the first actuator acts upon the selectors for engaging the butts into the first inlet point and making drop stitches on a yarn feed, and a first array of levers of the second actuator acts upon the selectors for engaging the butts into the second inlet point and making tuck stitches on said yarn feed.

In one aspect, if the needle-holding cylinder rotates in a second sense of rotation, preferably clockwise, with respect to the actuating cams, the second actuator acts upon the selectors for engaging the butts into the first inlet point and making drop stitches on a different, adjacent yarn feed, and the first actuator acts upon the selectors for engaging the butts, previously not engaged by the second actuator, into the second inlet point and making tuck stitches on said different, adjacent yarn feed.

In one aspect, if the needle-holding cylinder rotates in a second sense of rotation, preferably clockwise, with respect to the actuating cams, a second array of levers of the second actuator acts upon the selectors for engaging the butts into the first inlet point and making drop stitches on a different, adjacent yarn feed, and a second array of levers of the first actuator acts upon the selectors for engaging the butts into the second inlet point and making tuck stitches on said different, adjacent yarn feed.

In one aspect, the sub-needle has a butt, wherein the butt is radially movable between an operating position, in which it is extracted so as to engage with respective sub-needle paths defined by sub-needle cams and cause the activation of the needle and the stitch formation, and a non-operating position, in which it is retracted so as not to engage with said sub-needle paths.

In one aspect, the drive chain comprises an activating element slidingly arranged in the respective longitudinal groove between the sub-needle and the selector, wherein the activating element can be longitudinally moved with respect to the punch and with respect to the sub-needle and can be operatively engaged with the sub-needle so as to switch the butt of the sub-needle into and retain it in the respective operating position.

In particular, the Applicant has found that the activating element, which is free to move with respect to the punch and sub-needle, allows to decide where and when the radial extraction/insertion should take place, whatever the axial position of the punch and/or selector.

In other words, the punch pushes upwards upon the sub-needle and needle without causing every time the radially moving butt of the sub-needle to switch from the non-operating to the operating position, since this switching is caused by the activating element.

Moreover, for instance, the needle can be moved to a higher lever in non-operating position so as to perform the "flipping dial picking" without moving the lower elements, i.e. in particular the selector and/or the punch.

The solution underlying the present invention, which allows to control the extraction of the butt of the sub-needle whatever the axial position of the punch and/or selector, is particularly effective during stitch formation. "Stitch formation" means the working step during which the needle hooks a new yarn and gets down until the old stitch (previously formed)—as a result of the needle descent—from under the needle head goes over the heat, causing the knitting stitch to be completely formed.

In one aspect of the invention, the butt of the sub-needle is switched into and retained in said operating position during needle descent, and in particular during the step of needle descent corresponding to stitch formation.

In one aspect, the sub-needle, the punch, the selector and the activating element are flat parts. The drive chain is also known as "catenary" and is made up of the aforesaid flat parts slidingly inserted into the longitudinal grooves.

In one aspect, the drive chain is configured for decoupling an axial movement of the needle and/or of the sub-needle from an axial movement of the punch and/or of the activating element and/or of the selector.

In one aspect, the drive chain is configured for decoupling an axial movement of the activating element from an axial movement of the punch and/or of the needle and/or of the selector.

In one aspect, the drive chain is configured for decoupling the axial movement of the punch and/or of the selector from the activation/deactivation of the radially moving butt of the sub-needle.

In one aspect, the sub-needle and needle are made as one piece.

In a different aspect, the sub-needle and needle are discrete elements.

In one aspect, an upper end of the sub-needle is engaged with the needle, preferably with a two-side and/or hinge constraint.

In one aspect, the sub-needle comprises a supporting portion carrying the respective butt.

In one aspect, the activating element can be operatively engaged with the supporting portion.

In one aspect, said supporting portion is elastically movable between a first configuration, corresponding to the operating position of the butt, and a second configuration, corresponding to the non-operating position of the butt.

The Applicant has found that the elastic actuation allows to radially move the butt of the sub-needle (inactive needle) in a more effective and safer manner with respect to known movements obtained with oscillating stiff elements and/or by rotating the whole needle and/or sub-needle.

In one aspect, the supporting portion exerts an elastic restoring force upon the butt in the non-operating position of said butt.

In one aspect, in the non-operating position of said butt, said elastic force retains the supporting portion and the respective butt inside the respective groove.

The Applicant has found that the elastic restoring force ensures the radially retracted non-operating position in a safe and effective manner.

In one aspect, the activating element switches and retains the butt into the respective operating position against said elastic force.

In other words, the butt, when it is not engaged or stressed by the activating element, remains in the non-operating position thanks to the elastic restoring force and is actively moved to the operating position by means of said activating element.

In one aspect, the supporting portion comprises an elastically flexible arm extending, preferably projecting, towards the activating element. The elastic force is imparted by said elastically flexible arm.

In one aspect, the elastically flexible arm lies in the groove.

In one aspect, the elastically flexible arm extends basically parallel to an axial direction.

In one aspect, the sub-needle comprises a main body from which the elastically flexible arm extends and projects.

In one aspect, the supporting portion comprises a lower portion placed at a distal end of the elastically flexible arm, wherein the lower portion carries the butt of the sub-needle.

In one aspect, the sub-needle comprises a retaining element placed in a radially outer position with respect to the lower portion, so as to limit the radial stroke of the butt of the sub-needle.

In one aspect, the retaining element is defined by an axial extension of the sub-needle which develops from the main body and is preferably basically parallel to the elastically flexible arm.

At rest, the elasticity of the elastically flexible arm of the sub-needle retains in the non-operating position the radially moving butt, thus making the needle non-operating. The butt of the sub-needle must be activated in order to form the stitch with the needle. Thus, the butt is not free but is actively retained inside or outside the groove.

In one aspect, the sub-needle comprises an auxiliary butt.

In one aspect, the auxiliary butt radially extends from the main body of the sub-needle.

In one aspect, auxiliary sub-needle cams define auxiliary sub-needle paths and the auxiliary butt of the sub-needle can be engaged into said auxiliary sub-needle paths.

In one aspect, the sub-needle has an abutting surface axially pointing towards the punch.

In one aspect, said abutting surface is placed near an upper end of the sub-needle.

In one aspect, the punch extends at least partly parallel and in a radially more inner position with respect to the activating element and to the sub-needle.

In one aspect, the punch rests against a bottom surface of the respective groove.

In one aspect, the activating element and the sub-needle radially rest against the punch.

In one aspect, the punch comprises an elongated upper portion, preferably shaped as a bar, and a lower portion or foot located at a lower end of the elongated portion.

In one aspect, the activating element and the sub-needle radially rest against the elongated portion.

In one aspect, in the second configuration of the supporting portion, said supporting portion rests radially and at least partially against the punch, preferably against the elongated portion of the punch.

In one aspect, the lower portion of the punch has an abutting surface pointing towards the activating element.

In one aspect, an upper portion of the punch, preferably a distal end of the elongated upper portion, can be engaged against an abutting surface of the sub-needle, preferably by means of a single-side axial rest.

In the framework of the present invention, the wording "single-side axial rest" means a mechanical coupling or constraint between two elements, in which an axial thrust of a first element upon the second one, together with a movement of the first element towards the second element, causes a corresponding movement of the second element (integrally with the first one), whereas a movement of the first element away from the second element causes a separation between the two elements, without the second element being taken down; and vice versa.

In other words, this constraint is retained by means of a contact between the two elements when the first one moves towards the second one, whereas it is canceled when the first one moves in an opposite direction with respect to the second one, in which case there is a separation between the two elements.

In one aspect, a lower portion of the punch, preferably an abutting surface pointing towards the selector, can be engaged against an abutting surface of said selector, preferably by means of a single-side axial rest.

In one aspect, the butt of the punch extends radially from the lower portion of said punch.

In one aspect, the activating element has an upper end preferably provided with an inclined surface. Said upper end, preferably said inclined surface, cooperates with a lower portion of the supporting portion so as to switch the butt of the sub-needle into the respective operating position against the elastic force exerted by the supporting portion.

In one aspect, the inclined surface radially points outwards.

In one aspect, the lower portion of the supporting portion has an inclined surface facing the upper end of the activating element and configured for cooperating with the inclined surface of said activating element.

In one aspect, the activating element has a seat configured for receiving at least part of said lower portion and retain the butt of the sub-needle in the respective operating position and/or to axially push against the sub-needle.

In one aspect, said seat is located at said upper end of the activating element and is preferably counter-shaped to the lower portion of the supporting portion.

In one aspect, said seat develops in a continuous manner from the inclined surface of the activating element.

In one aspect, the activating element has a lower end which can be engaged against an abutting surface of the punch, preferably by means of a single-side axial rest.

In one aspect, the activating element has a respective butt.

In one aspect, activating element cams define activating element paths and the butt of the activating element can be engaged into said activating element paths.

In one aspect, the butt of the activating element radially extends from an axially intermediate area of the activating element.

In one aspect, the selector comprises an axially moving element slidingly arranged in the respective longitudinal groove.

In one aspect, the axially moving element of the selector carries the respective butt.

In one aspect, the selector has an auxiliary butt.

In one aspect, the axially moving element of the selector carries the respective auxiliary butt.

In one aspect, auxiliary actuating selector cams define auxiliary selector paths and the auxiliary butt of the selector can be engaged into said auxiliary selector paths.

In one aspect, the selector comprises an axially stationary element which can be engaged by the selecting device, wherein the axially stationary element is operatively engaged by the axially moving element so as to radially move the respective butt and the auxiliary butt, if present, between the operating and non-operating position.

In one aspect, the axially stationary element is oscillating by effect of the selecting device.

In one aspect, the axially moving element is oscillating by effect of the axially stationary element.

In one aspect, the axially stationary element comprises a plurality of teeth radially pointing outwards, which can be selectively engaged by the selecting device.

In one aspect, the axially stationary element is not present and the selecting device, preferably of magnetic type, directly acts upon the axially moving element.

In one aspect, the auxiliary butt of the sub-needle, the butt of the punch and the butt of the activating element are axially moving and radially stationary.

In one aspect, the butt of the selector and the auxiliary butt of the selector are axially moving and also radially moving.

In one aspect, a maximum stroke of the sub-needle and needle, when the radially moving butt is in the non-operating position, is longer than a maximum stroke of the punch.

In one aspect, a maximum stroke of the sub-needle and needle, when the radially moving butt is in the operating position, is shorter than a maximum stroke of the sub-needle and needle when the radially moving butt is in the non-operating position.

In one aspect, a maximum stroke of the punch is longer than a maximum stroke of the axially moving element of the selector.

In one aspect, a maximum stroke of the sub-needle and needle, when the radially moving butt is in the non-operating position, is about three times a maximum stroke of the axially moving element of the selector.

In one aspect, a maximum stroke of the sub-needle and needle, when the radially moving butt is in the non-operating position, is about 1,2 times a maximum stroke of the punch.

In one aspect, the needle-holding cylinder has a reference diameter which is smaller of about 200 mm, preferably smaller of about 100 mm. "Reference diameter" means the diameter measured on the bottom surface of the axial grooves defined on the outer surface of the cylinder, in which the needles are slidingly housed. In the technical field of circular knitting machines, the bottom surfaces of the grooves are referred to as "low background"; the reference diameter is thus defined with respect to this "low background".

In one aspect, the circular machine has a number of yarn feeding points (feeds) that is more than one, or preferably more than two, or preferably of four or above.

In one aspect, the invention relates to a method for moving the needles of a circular knitting machine, wherein preferably the machine is made according to one or more of the above aspects and/or to one or more of the appended claims and/or embodiments.

This method for moving the needles of a circular knitting machine comprises: radially moving a butt of a sub-needle, engaged with a respective needle, between an operating position, in which it is extracted so as to engage with respective sub-needle paths defined by sub-needle cams and cause the activation of the needle and the stitch formation, and a non-operating position (inactive needle), in which it is retracted so as not to engage with said sub-needle paths; wherein the radial movement of the butt of the sub-needle is caused by a relative axial movement between the sub-needle and the activating element axially located below the sub-needle; wherein this relative axial movement is, at least in some steps, disconnected/independent from an axial movement of a punch and/or of a selector arranged under the needle and operatively activated by a selecting device acting under control upon said selector.

In one aspect, during the relative axial movement between the sub-needle and the activating element, an upper end, preferably an inclined surface, of the activating element cooperates with a supporting portion of the butt of the sub-needle.

In one aspect, a basically radial elastic force acts upon a supporting portion of the butt of the sub-needle so as to retain the butt in the non-operating position.

In one aspect, during the movement from the non-operating to the operating position, the upper end of the activating element acts against the elastic force.

In one aspect, during the movement from the non-operating to the operating position, an upper end of the activating element is inserted between a needle-holding cylinder and a supporting portion of the butt of the sub-needle (in particular, it is inserted between an upper portion of the butt and a supporting portion of the butt of the sub-needle).

In one aspect, the elastic force restores the butt from the operating to the non-operating position.

In one aspect, in said step of radially moving the butt of the sub-needle, said butt is switched into and retained in said operating position during needle descent, and in particular during a step of needle descent corresponding to stitch formation.

In one aspect, the punch axially pushes upwards the activating element until a butt of the activating element engages with activating element cams and then said punch disengages said activating element.

In one aspect, punch cams, into which a butt of the punch is engaged, guide said punch axially upwards or downwards.

In one aspect, auxiliary sub-needle cams, into which an auxiliary butt of the sub-needle is engaged, guide said sub-needle axially downwards, while activating element cams, into which a butt of the activating element is engaged, guide the activating element upwards until the upper end of the activating element is inserted between the needle-holding cylinder and the supporting portion of the butt of the sub-needle.

In one aspect, auxiliary sub-needle actuating cams, into which an auxiliary butt of the sub-needle is engaged, guide said sub-needle axially upwards, while the activating element cams guide the activating element downwards until the upper end of the activating element is taken out from below the supporting portion of the butt of the sub-needle.

In one aspect, the punch directly pushes against the sub-needle so as to guide it upwards.

In one aspect, the selector, preferably an axially moving element of the selector, pushes the punch axially upwards until a butt of the punch engages with punch cams and then disengages the punch.

In one aspect, actuating selector cams, into which the butt of the selector is engaged, and/or auxiliary actuating selector cams, into which the auxiliary butt of the selector is engaged, guide said selector axially upwards or downwards.

In one aspect, an axially stationary element of the selector radially pushes upon the axially moving element of said selector so as to make it oscillate and cause the radial movement of the respective butt and auxiliary butt, if present.

In one aspect, a selecting device acts against the axially stationary element of the selector so as to make it oscillate and radially push upon the axially moving element.

In one aspect, a maximum axial stroke of an axially moving element of the selector is smaller than a maximum axial stroke of the needle and/or sub-needle and/or than a maximum axial stroke of the activating element and/or than a maximum axial stroke of the punch.

Further characteristics and advantages shall be more evident from the detailed description of a preferred embodiment of a circular knitting machine and of a method for moving the needles according to the present invention.

DESCRIPTION OF THE DRAWINGS

This description shall be made below with reference to the accompanying drawings, provided to a merely indicative and therefore non-limiting purpose, in which:

FIGS. 4a-4d show a length of the actuating cams developed on a plane with respective paths followed by the drive chain;

FIG. 6 shows a perspective view of a detail of the cams of FIGS. 5a and 5b;

FIG. 7 shows a perspective view of an actuator used in the machine as in the previous figures;

FIG. 8 shows a top view of the actuator of FIG. 7.

DETAILED DESCRIPTION

With reference to the figures mentioned, the numeral 1 globally designates a knitting head of a circular knitting machine according to the present invention.

The circular knitting machine comprises a basement, not shown since it is of known type, constituting the supporting structure of the machine, and said knitting head 1 mounted onto the basement.

The knitting head 1 is equipped with a needle-holding cylinder 2, with a plurality of needles 3 mounted onto the needle-holding cylinder 2, and with control means apt to selectively actuate the needles 3 so as to enable the production of a fabric.

The needle-holding cylinder 2 is usually mounted in vertical position onto the basement, with the needles 3 arranged vertically and protruding beyond an upper edge of the cylinder 2.

For instance, the needle-holding cylinder 2 has a reference diameter of about 100 mm and a height of about 450 mm.

Figure 1:
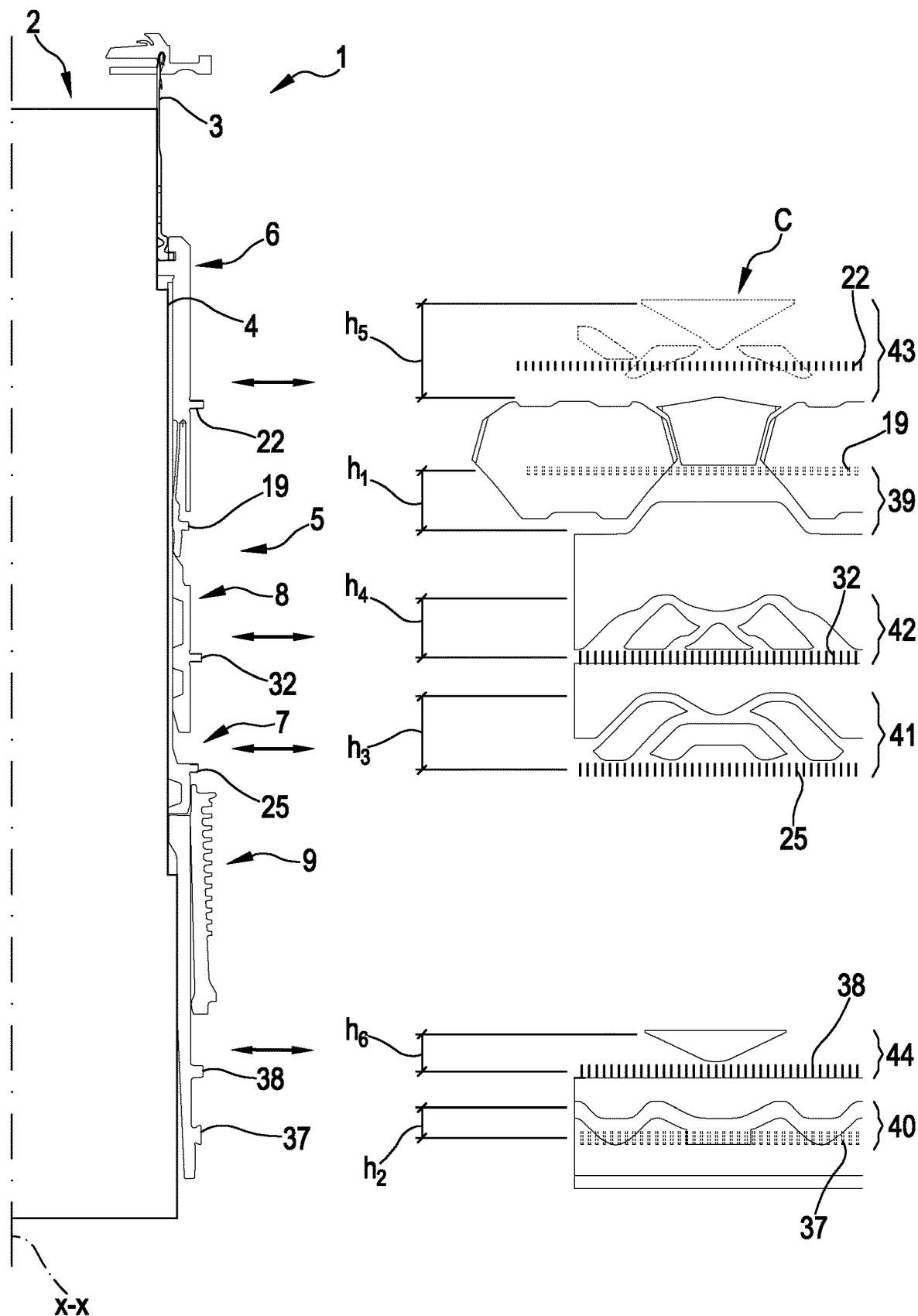
FIG. 1 shows a magnified portion of a needle-holding cylinder of a circular knitting machine according to the present invention, in which a drive chain of a needle can be seen, coupled with a length of the actuating cams developed on a plane.

As shown in FIG. 1, the needle-holding cylinder 2 has a plurality of longitudinal grooves 4 obtained on a radially outer surface of the cylinder 2. The longitudinal grooves 4 are arranged around a central axis "X-X" (vertical) of the needle-holding cylinder 2 and develop parallel to said central axis "X-X". Each longitudinal groove 4 houses a respective needle 3 and a respective drive chain 5 or "catenary" comprising a plurality of flat parts. Actuating cams "C" are arranged as a casing around the needle-holding cylinder 2 and lie facing the radially outer surface of the cylinder 2 and thus the longitudinal grooves 4 and the drive chains 5. These actuating cams "C" are defined by plates and/or grooves arranged on an inner surface of the casing.

For the sake of clarity, in FIG. 1 a length of these actuating cams "C" has been represented developed in the plane and beside the drive chain 5 coupled with one of the needles 3.

In the embodiment shown, the casing of the actuating cams "C" is basically stationary, whereas the needle-holding cylinder 2 rotates (with a continuous or alternating motion in both directions) around the central axis "X-X" so as to generate a relative rotational motion between the drive chains 5 and the actuating cams "C".

As shall be described below in further detail, the drive chains 5 can be operatively coupled with the actuating cams "C" so as to turn said relative rotational motion into axial movements of the needles 3 along the longitudinal grooves 4 so as to enable stitch formation by said needles 3. The actuating cams "C" define paths extending around the needle-holding cylinder 2, which are/can be engaged by butts belonging to the drive chains 5. Therefore, each drive chain 5 is operatively placed between the respective needle 3 and the actuating cams "C".

Suitable devices, not shown, feed the yarns to be knitted on one or more yarn feeding points (known as feeds) usually arranged above the needle-holding cylinder 2. For instance, the circular machine shown has four yarn feeding points.

Figure 2A:
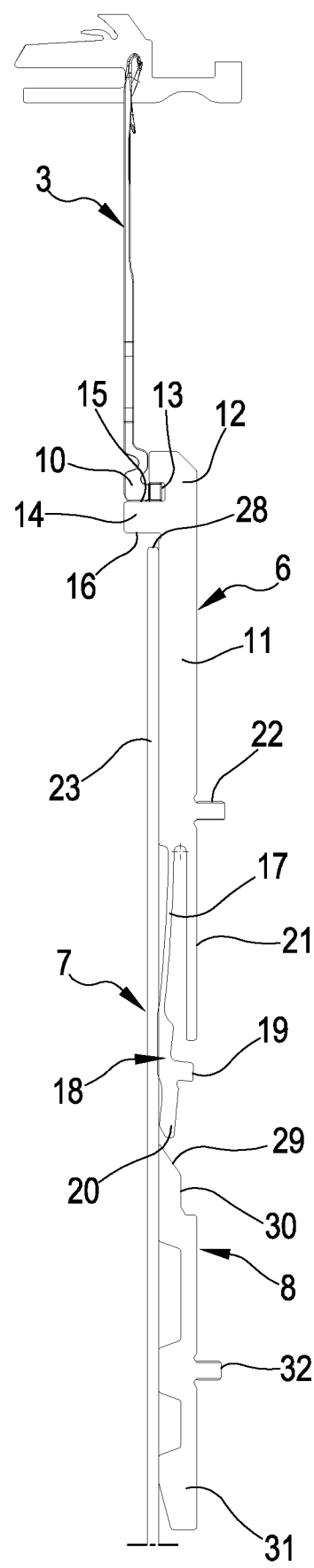
FIGS. 2a and 2b show respective magnified portions of the drive chain coupled with a needle.
Figure 2B:
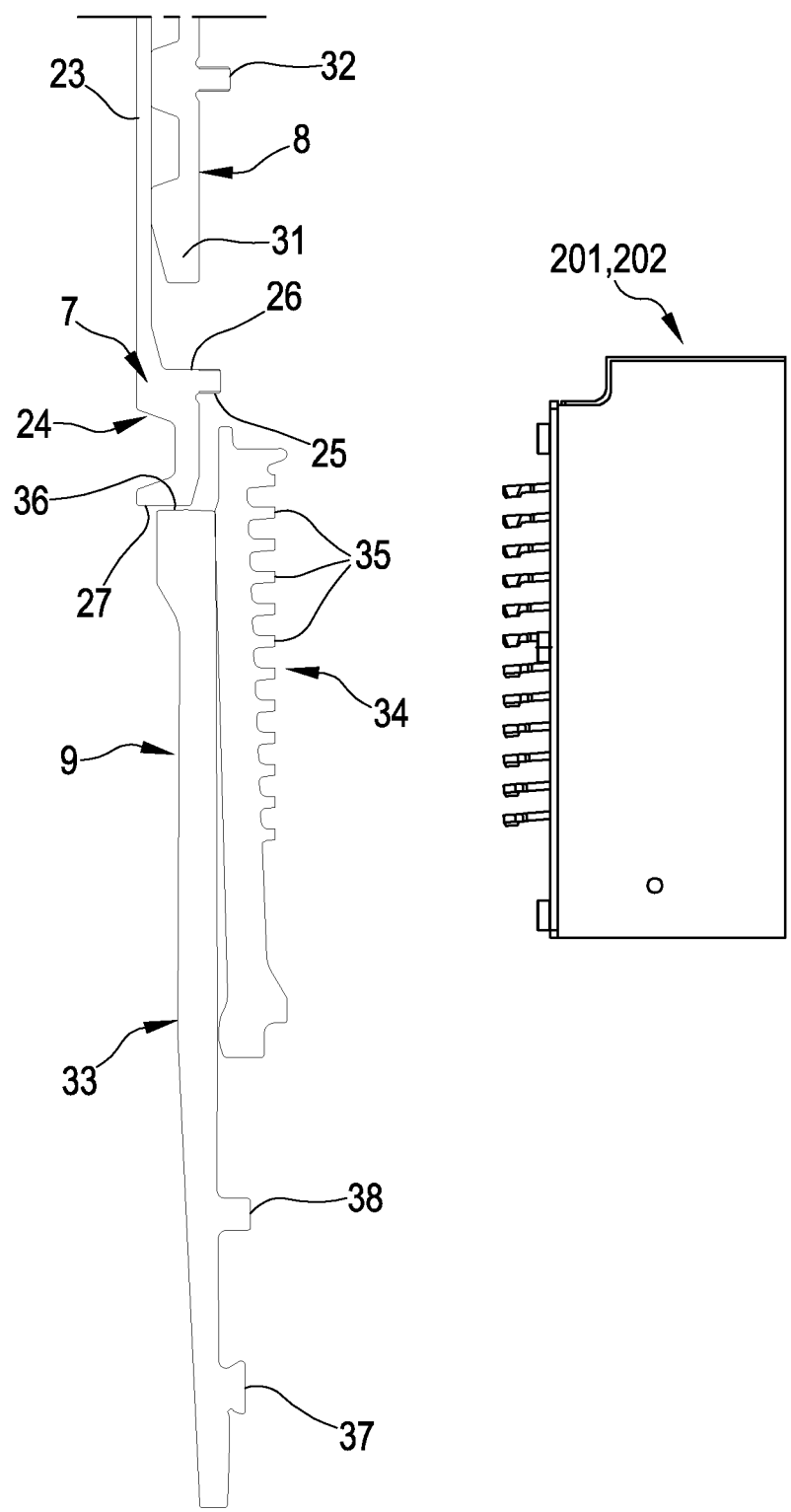

Reference shall now be made to a single drive chain 5 coupled with a respective needle 3, as shown in FIGS. 1, 2a and 2b. The relative positions of the various elements are described with reference to the drive chain 5 with the respective needle 3 correctly installed in the needle-holding cylinder 2 in vertical position.

The needle 3 is arranged on an upper edge of the needle-holding cylinder 2 and the drive chain 5 develops below the needle 3 as far as near a base of the needle-holding cylinder 2.

As can be better seen in FIGS. 2a and 2b, the drive chain 5 comprises: a sub-needle 6 arranged immediately below the needle 3, a punch 7 partially arranged below the sub-needle 6, an activating element 8 radially beside the punch 7 and placed below the sub-needle 6, a selector 9 positioned below the punch 7.

The needle 3 has a foot 10 shaped as a kind of hook. When the needle 3 is correctly positioned in the longitudinal groove 4, the foot 10 is oriented radially outwards.

The sub-needle 6 has a main body 11. An upper end 12 of the main body 11 has a seat 13 and a projection 14 located just below the seat 13. The projection 14 is provided with an upper surface 15 developing in a continuous manner from the seat 13, and with an opposed lower abutting surface 16. When the sub-needle 6 is correctly positioned in the longitudinal groove 4, the seat 13 and the projection 14 face radially towards the inside of said groove 4.

The needle 3 is firmly connected to the sub-needle 6 by the insertion of the foot 10 into the seat 13. The connection between the foot 10 and the seat 13 is two-side, i.e. the needle 3 and the sub-needle 6 move integrally along the longitudinal groove 4. The connection between the foot 10 and the seat 13 constitutes a kind of hinge since the needle 3 and the sub-needle 6 are mutually integral in their vertical axial movement, but can slightly oscillate one with respect to the other on the mutual connection. This hinge moves along a longitudinal groove 4 base on the axial movement of the needle 3 and the sub-needle 6 which are mutually integral. The foot 10 can be easily connected to or disconnected from the seat 13 so as to make it easier to assemble or disassemble both elements.

In a different embodiment, not shown, the sub-needle and needle are made as one piece.

An elastically flexible arm 17 extends and projects from the main body 11 and faces axially downwards, i.e. towards the activating element 8. A lower portion 18 placed at a distal end of the elastically flexible arm 17 carries a radially moving butt 19 of the sub-needle 6. Said lower portion 18 ends with a protrusion 20 which is rounded and/or provided with an inclined surface. The elastically flexible arm 17 and the lower portion 18 constitute an elastically moving supporting portion for the radially moving butt 19.

An axial extension 21 develops from the main body 11 downwards and parallel to the central axis "X-X". This axial extension 21 is located in a radially outer position with respect to the flexible arm 17 and is basically parallel to said flexible arm 17. The length of the axial extension 21 is smaller than an overall length of the supporting portion 17, 18, so that the radially moving butt 19 is still located below an end of said axial extension 21. As shall be more evident below, this axial extension 21 constitutes a retaining element for a radial stroke of the butt 19 of the sub-needle 6. As a matter of fact, the elastic flexibility of the elastically flexible arm 17 allows the lower portion 18 and the butt 19, when they are subjected to external stresses, to move along a basically radial path between an operating position, in which the butt 19 is extracted from the longitudinal groove 4, and a non-operating position, in which the butt 19 is retracted into the longitudinal groove 4. In the extracted position, the lower portion 18 rests against the axial extension 21. In both position, the elastically flexible arm 17 lies in the groove 4 (except for the butt 19 only, which in the extracted position radially rises from the groove 4).

The supporting portion 17, 18 as a whole is therefore elastically movable between a first configuration, corresponding to the operating position of the butt 19, and a second configuration, corresponding to the non-operating position of the butt 19.

The sub-needle 6 further comprises an auxiliary butt 22 extending radially from the main body 11 of the sub-needle 6. In the embodiment shown, this auxiliary butt 22 is connected to the main body 11 at a root portion of the axial extension 21.

The punch 7 comprises an elongated upper portion 23 shaped as a bar, and a lower portion 24 or foot located at a lower end of the elongated portion 23. The lower portion 24 carries a respective butt 25 developing radially and has an upper abutting surface 26 facing upwards, i.e. towards the sub-needle 6 and towards the activating element 8, and a lower abutting surface 27 facing downwards, i.e. towards the selector 9.

The punch 7 lies against a bottom surface of the longitudinal groove 4 and its radial position is stationary, as is the position of the respective butt 25, whereas said punch 7 can slide axially in said groove 4.

The main body 11 of the sub-needle 6 lies in a radially outer position with respect to the elongated upper portion 23 of the punch 7 and rest, always radially, against said elongated upper portion 23. The projection 14 of the sub-needle 6 lies against the bottom surface of the longitudinal groove 4 and a distal end 28 of the elongated upper portion 23 of the punch 7 still lies below the projection 14 and faces the lower abutting surface 16 of said projection 14.

Said distal end 28 can be engaged against the abutting surface 16 of the sub-needle 6 by means of single-side axial rest.

The elastic action exerted by the elastically flexible arm 17 radially pushes the lower portion 18 towards the elongated upper portion 23. In the configuration shown in FIGS. 1, 2a and 2b, the elastically flexible arm 17 retains the lower portion 18 against the elongated upper portion 23. In other words, the supporting portion 17, 18 exerts an elastic restoring force upon the butt 19 in the non-operating position of said butt 19 and, in said non-operating position, said elastic force retains the supporting portion 17, 18 and the respective butt 19 inside the groove 4.

Also the activating element 8 radially rests against the elongated upper portion 23 and is axially placed between the sub-needle 6 and the lower portion 24 of the punch 7.

The activating element 8 has an upper end provided with an inclined surface 29 which faces radially outwards and axially upwards, i.e. towards the sub-needle 6. In other words, the inclined surface 29 progressively approaches the distal end 28 rising towards the sub-needle 6.

The inclined surface 29 cooperates with the protrusion 20 of the supporting portion 17, 18, so as to switch the butt 19 of the sub-needle 6 into the respective operating position against the elastic force exerted by the supporting portion 17, 18. The coupling between the inclined surface 29 and the protrusion 20 constitutes, from a cinematic point of view, a flat cam, where a rising of the inclined surface 29 causes a radial rotation, towards the outside of the cylinder (i.e. towards the outside of the groove 4), of the butt 19 so as to switch it into the respective operating position.

The activating element 8 further has a seat 30 obtained on a radially outer edge of said activating element 8 and is near the inclined surface 29. Said seat 30 develops in a continuous manner from the inclined surface 29 of the activating element 8. The seat 30 is counter-shaped to the lower portion 18 of the supporting portion 17, 18 so as to house said lower portion 18 and retain the butt 19 of the sub-needle 6 in the respective operating position against the elastic force exerted by the arm 17 and/or to push axially against the sub-needle 6.

The activating element 8 has a lower end 31 which can be engaged against the abutting surface 26 of the punch 7 by means of a single-side axial rest.

A respective butt 32 developing along a radial direction is located in an axially intermediate area of the activating element 8. The activating element 8 rests radially against the elongated upper portion 23 and is free to slide axially with respect to said elongated upper portion 23. The butt 32 of the activating element 8 is radially stationary and axially moving.

The selector 9 comprises an axially moving element 33 slidingly arranged in the respective longitudinal groove below the punch 7, and an axially stationary element 34 which can be engaged by a selecting device 200, e.g. a selecting device with piezoelectric levers. The axially stationary element 34 is located in a radially outer position with respect to the axially stationary element 33 and has a plurality of radial teeth 35 placed side by side like a comb.

An upper end of the axially moving element 33 of the selector 9 has a respective abutting surface 36 pointing upwards and facing the lower abutting surface 27 of the punch 7. These abutting surfaces 27, 36 can be engaged one against the other by means of a single-side axial rest.

A lower portion of the axially moving element 33 of the selector 9 carries a respective butt 37 and a respective auxiliary butt 38 which extend radially outwards. The auxiliary butt 38 is located in an upper axial position with respect to the butt 37.

A radially inner edge of the axially moving element 33 and/or a bottom surface of the groove, against which said edge rests partially, are shaped so as to allow an oscillation of said axially moving element 33.

Also the axially stationary element 34 can oscillate by effect of the selecting device 200. The selecting device 200 shows in FIGS. 5a, 5b and 7, has a plurality of elements (e.g. a plurality of levers with piezoelectric actuation) which selectively engage the radial teeth 35 of the axially stationary element 34 and cause the rotation of said axially stationary element 34 acting in its turn against the axially moving element 33.

A radially inner edge of the axially stationary element 34 and/or a radially outer edge of the axially moving element 33 are shaped so as to allow a relative oscillation of said two elements.

In particular, the thrust of the axially stationary element 34 upon the axially moving element 33 allows said axially moving element 33 to oscillate between an operating position, in which the butt 37 and the auxiliary butt 38 are extracted from the groove 4, and a non-operating position, in which the butt 37 and the auxiliary butt 38 are retracted in said groove 4.

Figure 2C:
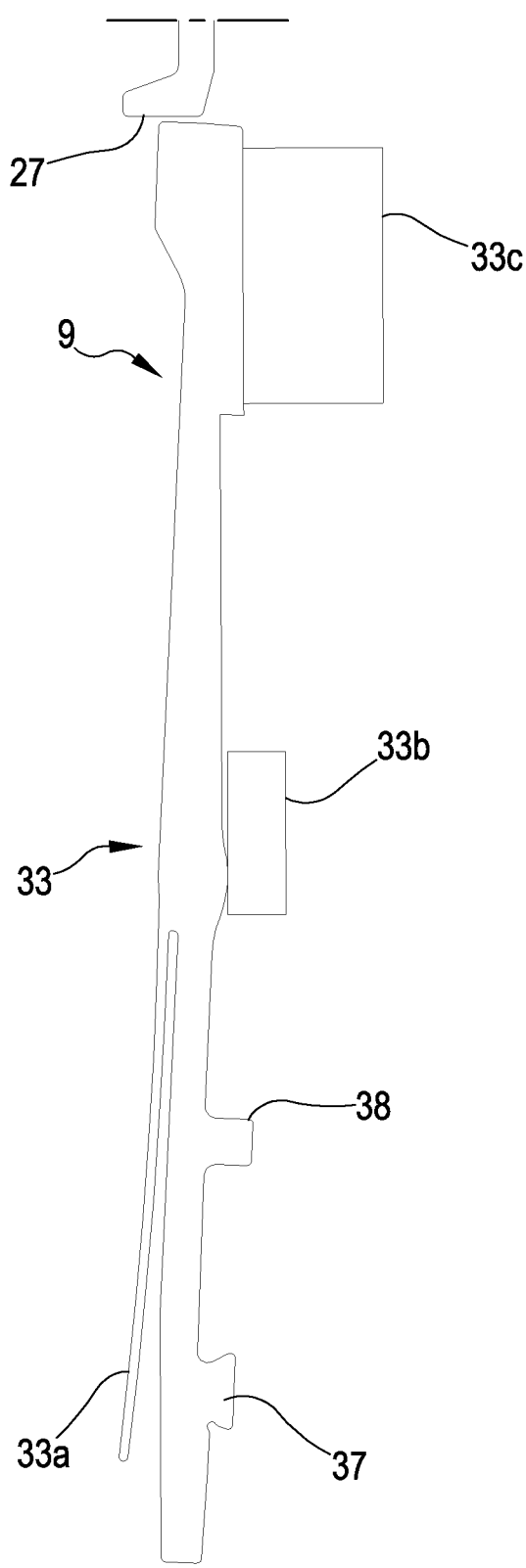
FIG. 2c shows a variant of an element of the drive chain.

In a different embodiment of the selector 9, shown in FIG. 2c, the axially stationary element is absent. The axially moving element 33 of the selector 9 comprises an elastically flexible extension 33a which extend downwards in a radially inner position with respect to the butt 37 and to the auxiliary butt 38 and lies in contact with a bottom surface of the groove 4. A stationary contrasting cam 33b is placed in a radially outer position with respect to the axially moving element 33 and rests against an axially intermediate ridge of the axially moving element 33. A stationary magnetic actuator 33c is placed at an upper end of the axially moving element 33. The force of the magnetic actuator 33c together with the elastic force exerted by the elastically flexible extension 33a and with the action of the contrasting cam 33b cause the oscillation of the axially moving element 33. The magnetic actuator 33c can be selectively actuated so as to cause—when suitable—the oscillation of the axially moving element 33 included in the selector being part of the drive chain coupled with a given needle.

As can be noted, the butt 37 and the auxiliary butt 38 of the selector 9 are both axially and radially moving; the auxiliary butt 22 of the sub-needle 6, the butt 25 of the punch 7 and the butt 32 of the activating element 8 are axially moving and radially stationary; the butt 19 of the sub-needle 6 is axially and radially moving.

The radially stationary butts 22, 25, 32 always lie outside the longitudinal groove 4. The radially moving butts 19, 37, 38 are retracted in the longitudinal groove when they are in the respective non-operating positions and lie outside the longitudinal groove 4 when they are in the respective operating positions.

The actuating cams "C" are configured for receiving and engaging the radially stationary butts 22, 25, 32 and the radially moving butts 19, 37, 38.

As can be seen in FIG. 1, the actuating cams "C" comprise sub-needle cams 39 placed axially on the sub-needle 6 and configured for receiving and engaging the radially moving butt 19 of said sub-needle 6. The sub-needle 39 define sub-needle paths into which the radially moving butt 19 of the sub-needle 6 can be engaged. The radially moving butt 19 of the sub-needle 6 in the operating position is extracted from the groove 4 so as to engage with these sub-needle paths and cause the activation of the needle 3 and stitch formation. The radially moving butt 19 of the sub-needle 6 in the non-operating position is retracted so as not to engage with said sub-needle paths.

The actuating cams "C" comprise selector cams 40 placed on a base of the needle-holding cylinder 2 and configured for receiving and engaging the butt 37 of the axially moving element 33 of the selector 9. The selector cams 40 define selector paths into which the butt 37 of the axially moving element 33 can be engaged. The butt 37 of the selector 9 in the operating position is extracted from the groove 4 so as to engage with these selector paths. The butt 37 of the selector 9 in the non-operating position is retracted so as not to engage with said selector paths.

The actuating cams "C" comprise punch cams 41 placed axially on the lower portion 24 of the punch 7 and configured for receiving and engaging the butt 25 of said punch 7. The punch cams 41 define punch paths into which the radially stationary butt 25 of the punch 7 can be engaged. As can be noted, the punch paths defined by the punch cams 41 comprise a basic path at a constant axial height, i.e. lying on a circumference, and paths with a variable axial height, with rises and descents. The punch cams 41, into which the butt 25 of the punch 7 is engaged, are thus configured for guiding said punch 7 axially upwards or downwards.

The actuating cams "C" comprise activating element cams 42 placed axially just above the punch cams 41 and on the activating element 8 and configured for receiving and engaging the butt 32 of said activating element 8. The activating element cams 42 define activating element paths into which the radially stationary butt 32 of the activating element 8 can be engaged. As can be noted, the activating element paths defined by the activating element cams 42 comprise a basic path at a constant axial height, i.e. lying on a circumference, and paths with a variable axial height, with ascents and descents.

The actuating cams "C" comprise auxiliary sub-needle cams 43 placed axially just above the sub-needle cams 39 and on the sub-needle 6 and configured for receiving and engaging the auxiliary butt 22 of the sub-needle 6. The auxiliary sub-needle 43 define auxiliary sub-needle paths into which the auxiliary, radially stationary butt 22 of the sub-needle 6 can be engaged. As can be noted, the auxiliary sub-needle paths defined by the auxiliary sub-needle cams 43 comprise a basic path at a constant axial height, i.e. lying on a circumference, and paths with a variable axial height, with rises and descents. At least some of the auxiliary sub-needle cams 43 are radially movable since they can be guided to a non-operating position inside the casing and therefore cannot be engaged by the butt 22 of the sub-needle 6 which is radially stationary.

As shown in FIGS. 4a-4d, the auxiliary sub-needle cams have been represented with dashed lines when they lie in the non-operating position inside the casing, and have been represented with solid lines when they are operating, i.e. extracted and protruding with respect to a bottom surface of the casing.

The actuating cams "C" comprise auxiliary selector cams 44 placed just above the selector cams 40 and configured for receiving and engaging the auxiliary butt 38 of the axially moving element 33 of the selector 9. The auxiliary selector cams 44 define auxiliary selector paths into which the auxiliary butt 38 of the axially moving element 33 can be engaged. The auxiliary butt 38 of the selector 9 in the operating position is extracted so as to engage with these auxiliary selector paths. The auxiliary butt 38 of the selector 9 in the non-operating position can be retracted so as not to engage with said auxiliary selector paths. As can be noted, the auxiliary selector paths defined by the auxiliary selector cams 44 comprise a basic path at a constant axial height, i.e. lying on a circumference, and paths with a variable axial height, with ascents and/or descents. The selector cams 40, into which the butt 37 of the selector 9 is engaged, and/or the auxiliary selector cams 44, into which the auxiliary butt 38 of the selector 9 is engaged, guide said selector 9 axially upwards or downwards.

As can be noted from FIG. 1, each of the paths has a respective first, second, third, fourth, fifth and sixth axial extension h1, h2, h3, h4, h5, h6. "Axial extension" of the paths means the distance, measured parallel to the central axis "X-X", between points of a path that are most distance one from the other. In other words, the axial extension is the maximum axial length which the butts 19, 22, 25, 32, 38, 37 can go over while they are guided in the respective paths and/or by the respective cams 39, 43, 41, 42, 44, 40.

The maximum stroke of the sub-needle 6 and of the needle 3 corresponds to the fifth axial extension h5. The maximum stroke of the sub-needle 6 and of the needle 3 can be limited by the radially moving butt 19 in the operating position and in this case corresponds to the first axial extension h1. The maximum stroke of the activating element 8 corresponds to the fourth axial extension h4. The maximum stroke of the punch 7 corresponds to the third axial extension h3. The maximum stroke of the axially moving element 33 of the selector 9 corresponds to the second and sixth axial extension h2, h6.

As can be noted from FIG. 1, the maximum stroke of the sub-needle 6 and of the needle 3, when the radially moving butt 19 is in the non-operating position (fifth axial extension h5), is longer than the maximum stroke of the punch 7 (third axial extension h3), which is in its turn longer than the maximum stroke of the axially moving element 33 of the selector 9 (second and sixth axial extension h2, h6). For instance, the maximum stroke of the sub-needle 6 and of the needle 3, when the radially moving butt 19 is in the non-operating position, is about 1.2 times the stroke of the punch 7 and is about three times the maximum stroke of the axially moving element 33 of the selector 9.

In the embodiment shown, the maximum stroke of the sub-needle 6 and of the needle 3, when the radially moving butt 19 is in the operating position (first axial extension h1), is shorter than the maximum stroke of the sub-needle 6 and of the needle 3 when the radially moving butt 19 is in the non-operating position (fifth axial extension h5). For instance, the fifth axial extension h5 is about two times the first axial extension h1.

The maximum stroke of the activating element 8 (fourth axial extension h4) is shorter than the maximum stroke of the sub-needle 6 and of the needle 3 when the radially moving butt 19 is in the non-operating position (fifth axial extension h5), and is longer than the maximum stroke of the axially moving element 33 of the selector 9. For instance, the fourth axial extension h4 is about two times the second and sixth axial extension h2, h6 and is about ⅔ of the fifth axial extension h5.

The drive chain 5 is thus configure for decoupling the axial movement of the needle 3 and/or of the sub-needle 6 from the axial movement of the punch 7 and/or of the selector 9; the axial movement of the activating element 8 can actually be decoupled from the one of the punch 7 and/or of the needle 3 and/or of the sub-needle 6 and/or of the selector. 9.

Moreover, the drive chain 5 is configured for decoupling the axial movement of the punch 7 and/or of the selector 9 from the activation/deactivation of the radially moving butt 19 of the sub-needle 6 (switching between the non-operating position or inactive needle and the operating position).

Figures 3G, 3H, 3I, 3L, 3M, 3N:
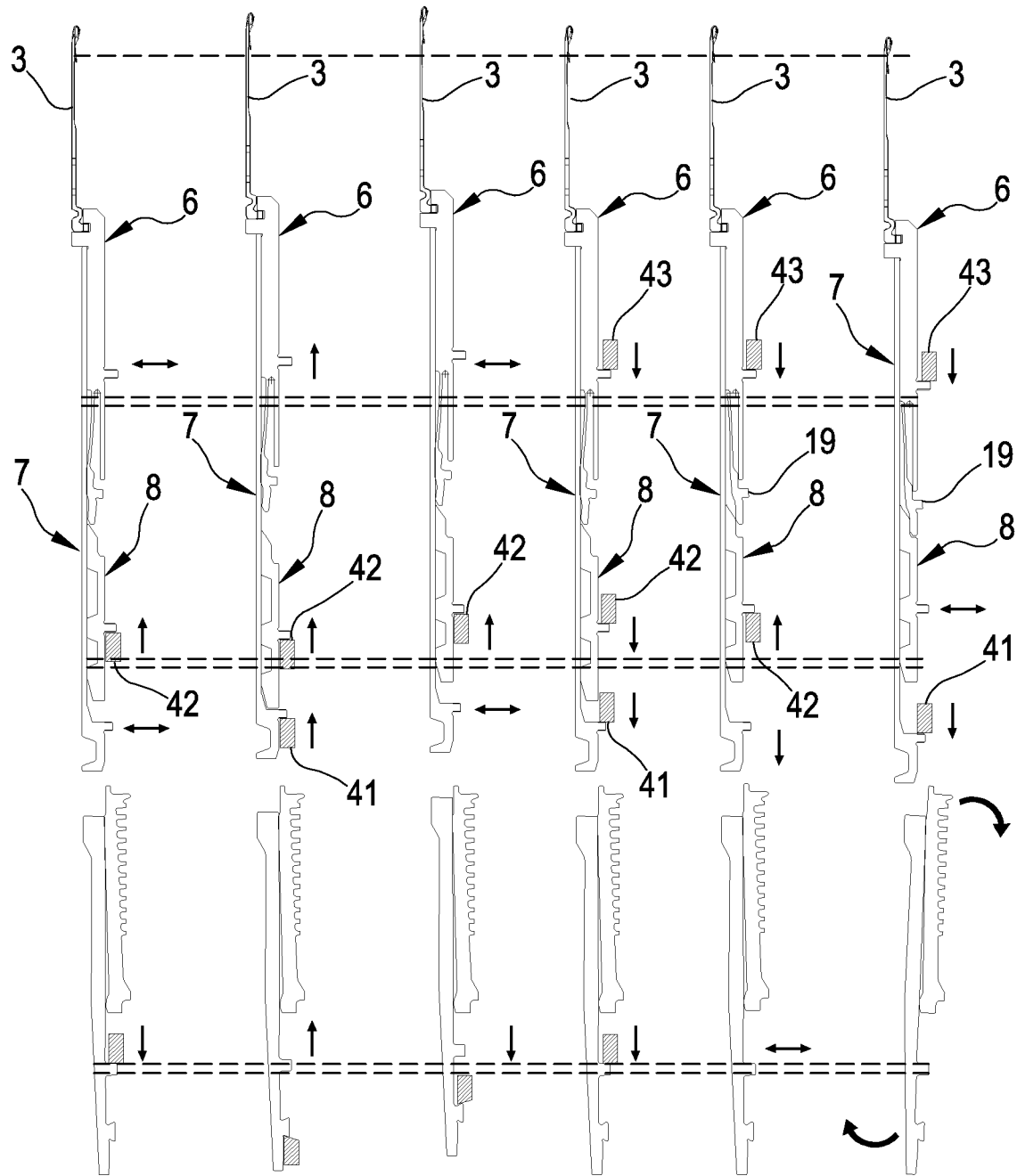
FIGS. 3a-3t show a series of possible configurations of the drive chain.
Figures 3O, 3P, 3Q, 3R, 3S, 3T:
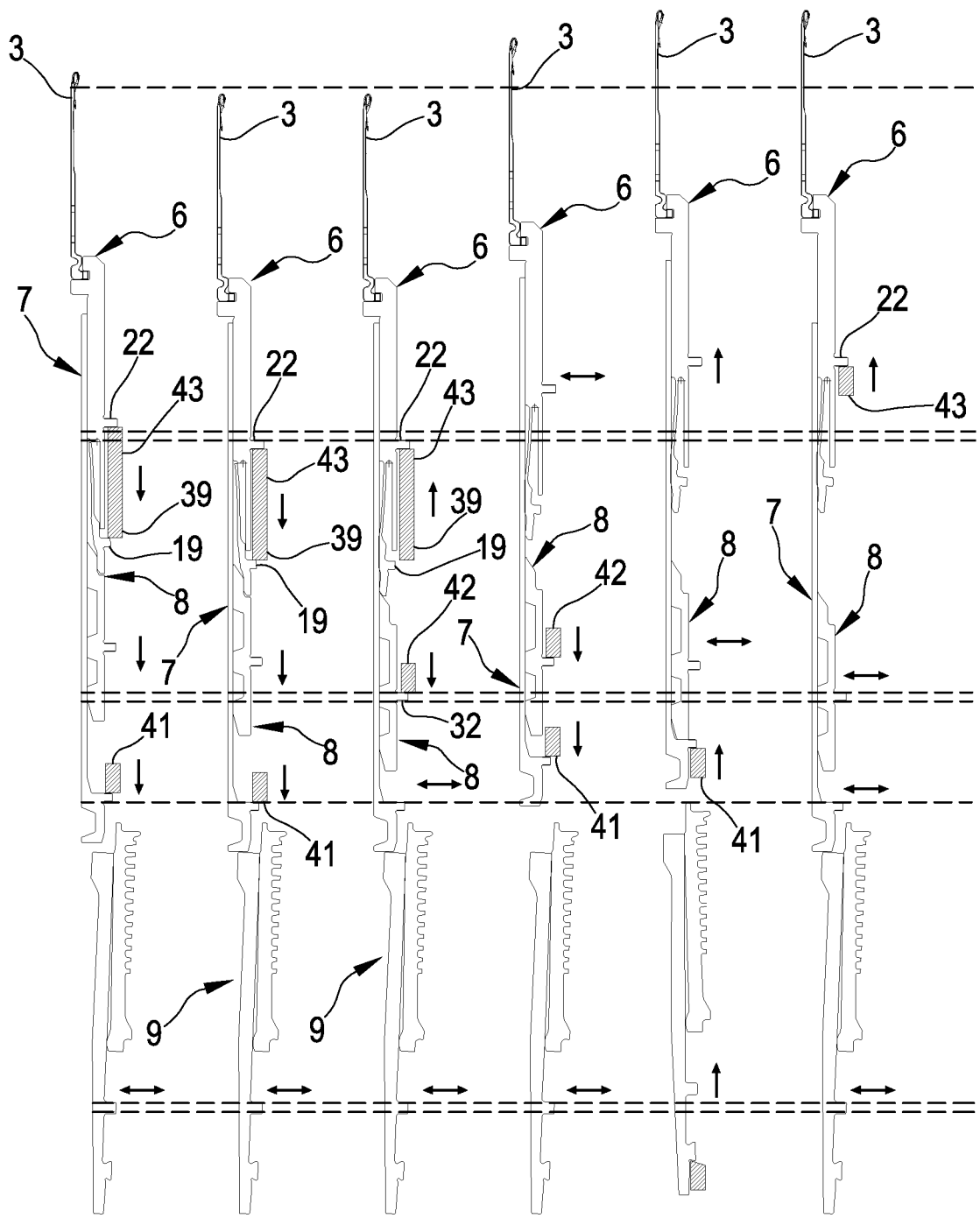

The drive chain described and constituting the object of the present invention can be arranged, cooperating with the actuating cams "C" and with the selecting device 200, according to a plurality of configurations such as shown e.g. in FIGS. 3a-3t.

In FIG. 3a the butt 37 is retracted in the respective longitudinal groove 4 or disengaged from the respective selector cam 40. The axially moving element 33 of the selector 9 is in the axially lowest position, the punch 7 rests on the axially moving element 33 and its butt 25 follows the basic path at a constant axial height of the punch cams 41. Also the butt 32 of the activating element 8 follows its basic path at a constant axial height of the activating element cams 42. The auxiliary butt 22 of the sub-needle 6 follows its basic path at a constant axial height of the auxiliary sub-needle cams 43. The activating element 8 is axially distanced from the sub-needle 6 and the butt 19 of the sub-needle 6 is in the non-operating position, disengaged from the respective sub-needle cams 39. The distal end 28 of the punch 7 is distanced from the lower abutting surface 16 of the projection 14. The height of the needle 3 is determined by the axial position of the auxiliary butt 22.

In FIG. 3b, the selecting device 200 acts upon the axially stationary element 34 and causes the rotation thereof and therefore of the axially moving element 33, so that the butt 37 and the auxiliary butt 38 are extracted from the longitudinal groove 4 and engage into the selector cams 40 and auxiliary selector cams 44. The other elements are in the position of FIG. 3a.

In FIG. 3c, the butt 37 of the axially moving element 33 is pushed axially upwards by the selector cams 40 and pushes against the punch 7, which in its turn pushed against the sub-needle 6. As a result, when the butt 25 of the punch 7, and possibly the auxiliary butt 22 of the sub-needle 6, find the respective paths at a variable axial height, get therein and the punch 7 and the sub-needle 6 with the needle 3 start to rise. The activating element 8 is axially stationary since it is axially disconnected from the others.

In FIG. 3d, the punch 7, the sub-needle 6 and the needle 3 move upwards under the thrust exerted by the punch cams 41 and/or by the selector cams 40. The punch 7 directly pushes against the sub-needle 6 so as to guide it upwards. The activating element 8 is axially stationary.

In FIG. 3e, the punch 7, the sub-needle 6 with the needle 3 are supported by the punch cams 41, whereas the axially moving element 33 is guided downwards by the selector 40 and is disconnected from the punch 7.

In FIG. 3f, the punch cams 41 push upwards the punch 7 which, beyond raising the sub-needle 6 and the needle 3, gets in contact with the activating element 8 and pushed it upwards. As a result, when the butt 32 of the activating element 8 finds the paths at a variable axial height of the activating element cams 42, it engages therein and can be raised by them and then said punch 7 can disengage from said activating element 8. In the meantime, the axially moving element 33 is axially distanced from the punch 7.

In FIG. 3g, the sub-needle 6 with the needle 3 and the punch 7 are axially stationary, whereas the activating element cams 42 raise the activating element 8 which approaches the sub-needle 6 without engaging it.

In FIG. 3h, the punch cams 41 guide the punch 7, the sub-needle 6 and the needle 3 upwards moving the sub-needle 6 away from the activating element 8.

In FIG. 3i, whereas the punch 7, the sub-needle 6 and the needle 3 are axially stationary, the activating element 8 is moved upwards by the activating element cams 42.

In FIG. 3l, the punch cams 41 and the auxiliary sub-needle cams 43 guide the punch 7, the sub-needle 6 and the needle 3 axially downwards. The activating element cams 41 also guide the activating element 8 downwards.

In FIG. 3m, the auxiliary sub-needle cams 43 guide the punch 7, the sub-needle 6 and the needle 3 axially downwards, whereas the activating element cams 42 push upwards the activating element 8 until the inclined surface 29 is inserted axially below the protrusion 20, placing itself radially between the punch 7 and said protrusion 20, against the elastic force exerted by the supporting portion 17, 18.

In FIG. 3n, the punch cams 41 and the auxiliary sub-needle cams 43 guide the punch 7, the sub-needle 6 and the needle 3 downwards, whereas the activating element ends its stroke and is axially stationary, with the protrusion 20 positioned in the seat 30 and the butt 19 of the sub-needle 6 in the respective operating position.

In FIG. 3o, the butt 19 and the auxiliary butt 22 of the sub-needle 6 are both engaged by the respective sub-needle cams 39 and auxiliary sub-needle cams 43 and move axially integral downwards also together with the activating element 8. The punch 7 is distanced from the sub-needle 6 and is moved downwards by the punch cams 41.

As can be noted in FIGS. 3e-3o, the axially moving element 33 is always distanced from the punch 7.

In FIG. 3p, the butt 19 and the auxiliary butt 22 of the sub-needle 6 are both engaged by the respective sub-needle cams 39 and auxiliary sub-needle cams 43 and move axially integral downwards also together with the activating element 8. The punch 7 rests against the selector 9.

In FIG. 3q, the sub-needle 6 and the needle 3 are guided upwards by the auxiliary sub-needle cams 43, the activating element 8 is guided downwards by the activating element cams 42 and disengages from the sub-needle 6, so that the butt 19 of the sub-needle 6 is switched back to the non-operating condition by the elastic force of the elastically flexible arm 17. Then, the basically radial elastic force acts upon the supporting portion 18 of the butt 19 of the sub-needle 6 so as to retain the butt 19 in the non-operating position.

In FIG. 3r, the punch cams 41 and the activating element cams 42 guide the punch 7 and the activating element 8, respectively, downwards, whereas the needle 3 and the sub-needle 6 remain stationary in a floated needle position.

In FIG. 3s, the needle and the sub-needle 6 are pushed upwards, whereas the activating element 8 is in a stationary axial position and the punch 7 is guided against the activating element 8 by the punch cams 41.

FIG. 3t shows the picking position of the needle 3, in which the needle 3 and the sub-needle 6 are pushed upwards by the auxiliary sub-needle cams 43 and are distanced from the punch 7 and from the activating element 8.

As can be noted in FIGS. 3r and 3s, the axially moving element 33 is axially distanced from the punch 7.

By combining the configurations disclosed above into predefined sequences thanks to the structure of the actuating cams, the needle 3 is moved so as to execute the required knitting operations.

By mere way of example, FIGS. 4a-4d show some working sequences. The sense of rotation of the needle-holding cylinder 2 with respect to the casing of the actuating cams "C" is indicated by arrow "CCW" (first sense of rotation or counterclockwise sense of rotation of the needles 3 and of the drive chains 5 with respect to the actuating cams "C"). The lengths of the paths of the butts engaged into the respective cams have been represented with vertical bars, whereas the lengths of the paths of the butts disengaged from the respective cams have been represented with horizontal dashed lines. The path of the terminal end of the needle 3 has not been represented, but this path is always parallel to the one of the butt 22 of the sub-needle 6 to which the needle 3 is integrally connected during the vertical movement.

FIG. 4a shows the step with withdrawn needle 3. The vertical lines 3b, 3d and 3g represent three positions of the needle 3 and of the drive chain 5 whose configurations correspond to those of FIGS. 3b, 3d and 3g. This means that, looking at FIG. 4a from right to left, the butt 37 of the selector 9 is activated and engages with the selector cams 40 rising upwards thanks to the ascent 100 and pushing the punch 7, the sub-needle 6 and the needle 3 upwards, so that the butt 25 of the punch 7 gets engaged and follows the ascent 101 (tuck stitch ascent) of the punch cams 41. The auxiliary sub-needle cams 43 are in the non-operating position. The radially moving butt 19 of the sub-needle 6 is in the non-operating position. The needle 3 is guided into the position of FIG. 3g by the punch cams 41 while the punch 7 disconnects from the selector 9.

Figure 4B:
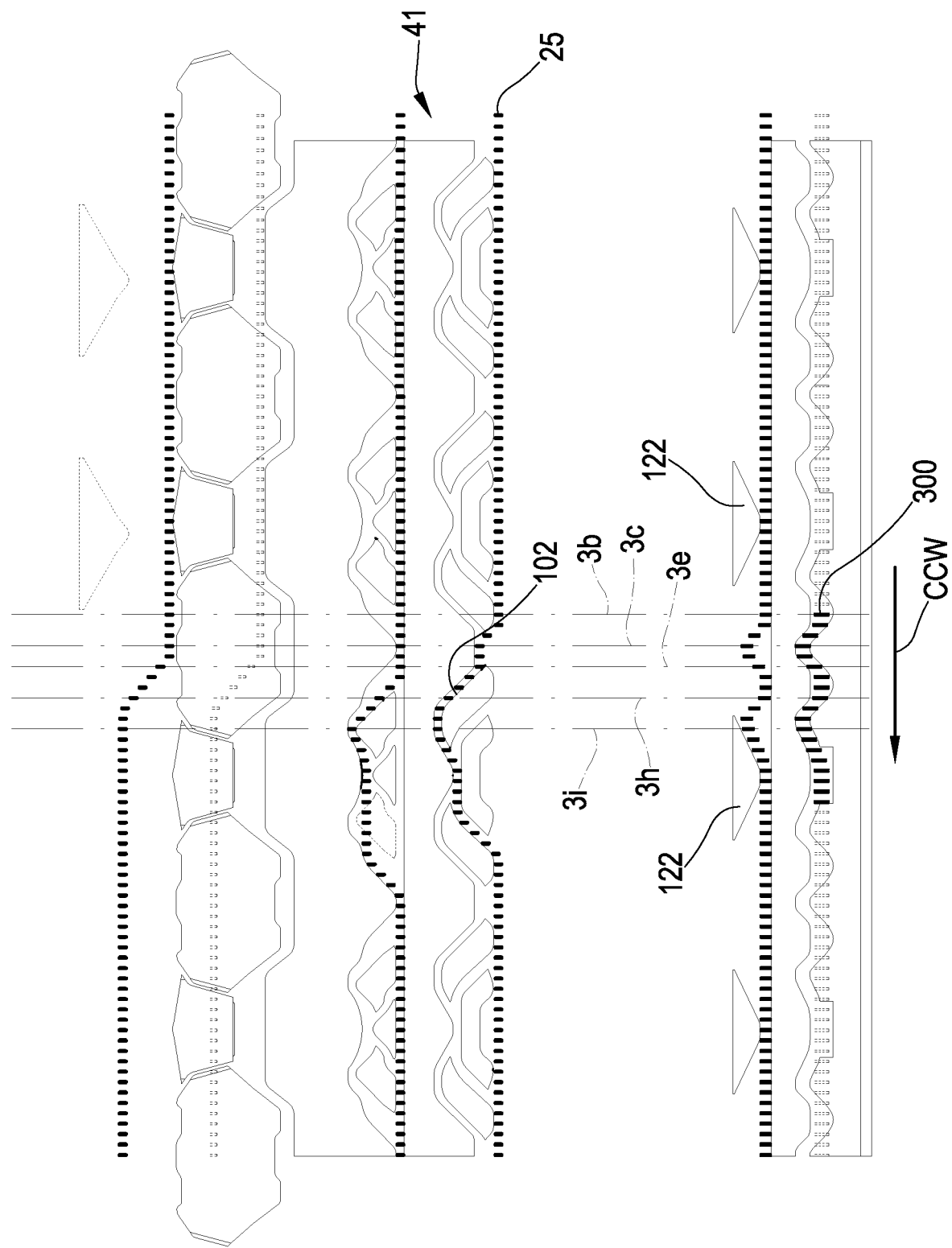

FIG. 4b shows the step with cast-off needle 3. The vertical lines 3b, 3c, 3e, 3i and 3h represent five positions of the needle 3 and of the drive chain 5 whose configurations correspond to those of FIGS. 3b, 3c, 3e, 3i and 3h. This means that, looking at FIG. 4b from right to left, it is again the butt 25 of the punch 7 that, first raised by the selector 9 (FIGS. 3b and 3c) and cooperating with the punch cams 41 (drop stitch ascent 102), guides the needle 3 into the position of FIG. 3i.

FIG. 4c shows the step with needle 3 at picking height. The vertical line 3t represents the position of the needle 3 and of the drive chain 5 whose configuration corresponds to those of FIG. 3t. This means that, looking at FIG. 4c from right to left, one of the auxiliary sub-needle cams 43 is guided into the respective operating position and the auxiliary butt 22 of the sub-needle 6 engages with an ascent 103 of said cam until the needle 3 is guided into the position of FIG. 3t, while the punch 7, the activating element 8 and the selector 9 remain in the lower axial position.

FIG. 4d shows the step of needle 3 lowering. The vertical lines 3b, 3c, 3e, 3h, 3i, 3l, 3m, 3n, 3o, 3p, 3q represent eleven positions of the needle 3 and of the drive chain 5 whose configurations correspond to those of FIGS. 3b, 3c, 3e, 3h, 3i, 3l, 3m, 3n, 3o, 3p, 3q. This means that, looking at FIG. 4d from right to left, some of the auxiliary sub-needle cams 43 are guided into the respective operating positions. The needle 3 and the sub-needle 6 are guided downwards first by the auxiliary butt 22, which cooperates with descents 104, 105 defined by the auxiliary sub-needle cams 43, operating, and then also by the radially moving butt 19 guided into its operating position (Figures and vertical lines 3m, 3n, 3o) and engaged into the descent 106.

What is described above is an example of the method for moving the needles of a circular knitting machine being the object of the present invention, which more generally comprises radially moving the butt 19 of the sub-needle 6 between the operating position, in which it is extracted so as to engage with respective sub-needle paths defined by the sub-needle cams 39 and cause the activation of the needle 3 and the stitch formation, and the non-operating position (inactive needle), in which it is retracted so as not to engage with said sub-needle paths. The radial movement of the butt 19 of the sub-needle 6 is caused by the relative axial movement between the sub-needle 6 and the activating element 8 axially located below the sub-needle 6, and this relative axial movement is, at least in some steps, disconnected/independent from the axial movement of the punch 7 and also of the selector 9.

Figure 5A:
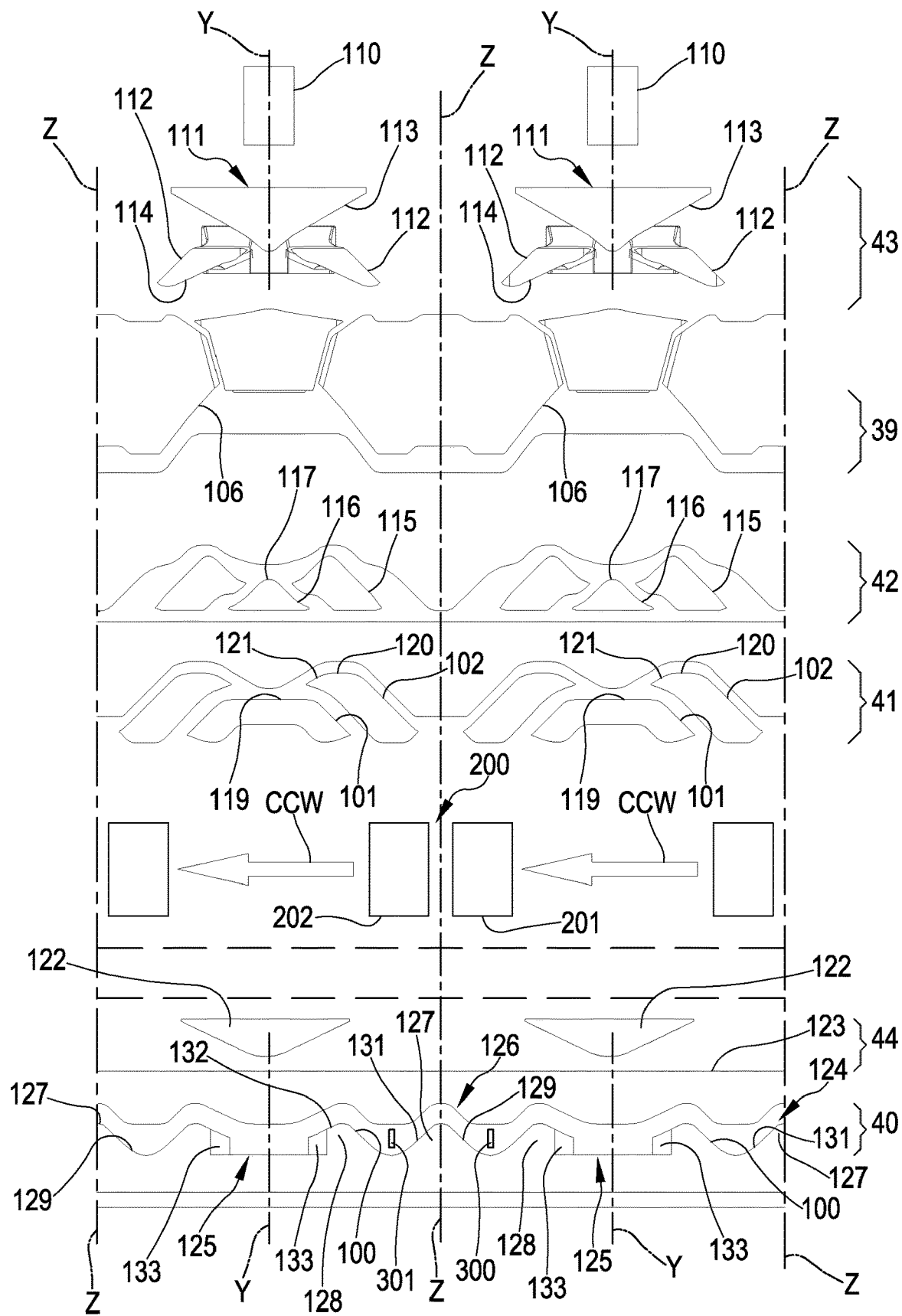
FIG. 5a shows a magnified portion of the actuating cams while operating in a counterclockwise sense of rotation.
Figure 5B:
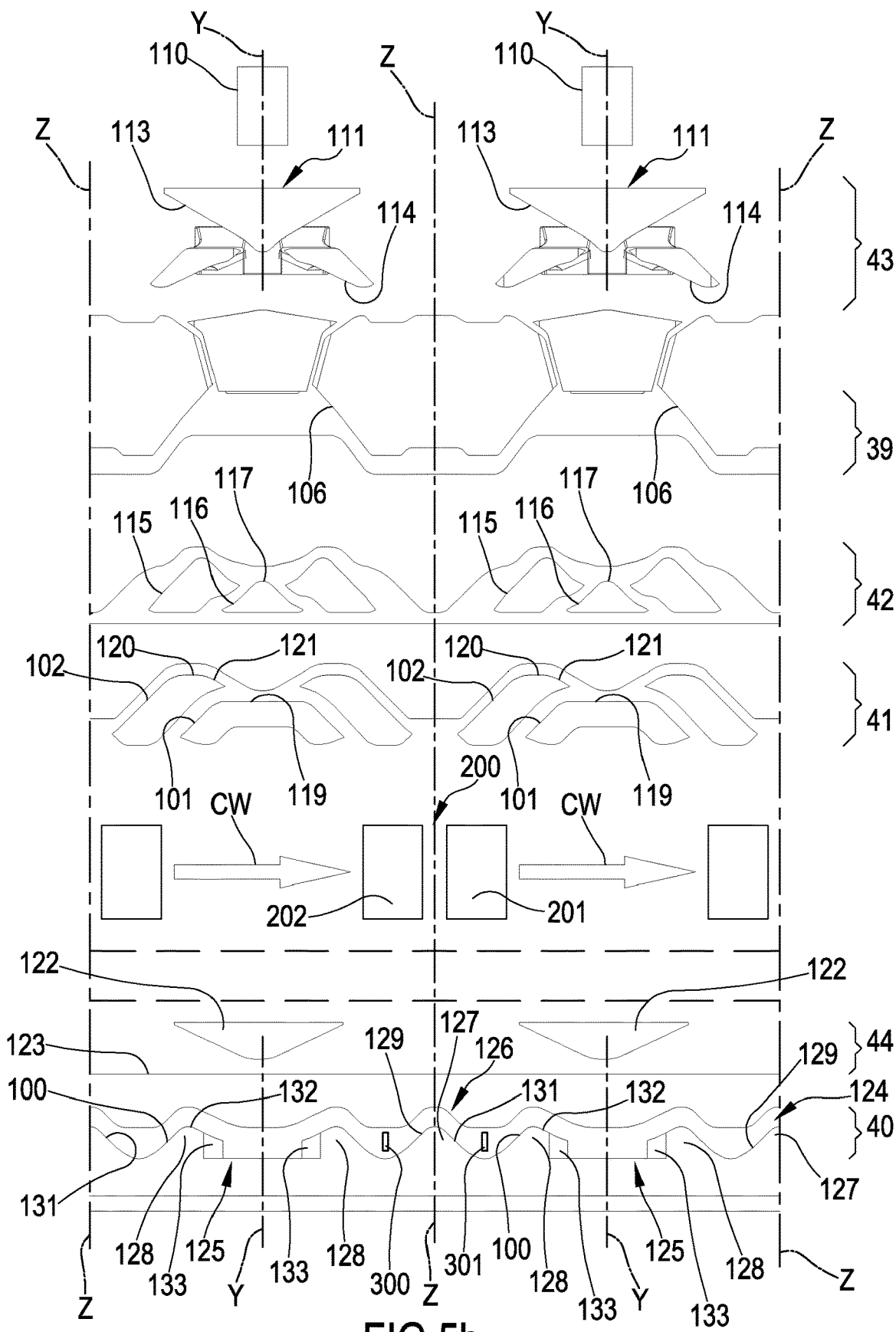
FIG. 5b shows the portion of FIG. 5a while the cams operate in a clockwise sense of rotation.

Reference shall now be made to FIGS. 5a and 5b so as to point out other characteristics related to the shape of the actuating cams "C". The cam portion of FIGS. 5a and 5b show the development on the plane of one half of the actuating cams "C". The other half is identical with the one shown in FIGS. 5a and 5b. Two yarn feeds 110 circumferentially one after the other are schematically shown in FIGS. 5a and 5b. This portion therefore corresponds to two of the four yarn feeds 110 of the machine 1.

Each yarn feed 110 is associated with cams that are symmetrical with respect to said yarn feed 110, i.e. symmetrical with respect to an axis of symmetry "Y" parallel to the central axis "X-X" and going through the yarn feed 110. Moreover, the cams are also symmetrical with respect to a middle axial straight line "Z" placed between the two yarn feeds 110. This symmetry allows the machine 1 to work in both senses of rotation, also in oscillating mode.

Portions of the sub-needle cams 39, auxiliary sub-needle cams 43, activating element cams 42, punch cams 41, selector cams 40, auxiliary selector cams 44 between two successive axes of symmetry "Y", represent first modules repeating (four times in the example shown) on the whole circumferential development of the casing of the actuating cams "C".

Portions of the sub-needle cams 39, auxiliary sub-needle cams 43, activating element cams 42, punch cams 41, selector cams 40, auxiliary selector cams 44 between two successive middle axial straight lines "Z", represent second modules repeating (four times in the example shown) on the whole circumferential development of the casing of the actuating cams "C".

The cam portions between two successive axes of symmetry "Y" are symmetrical with respect to the middle axial straight line "Z" placed between said two axes of symmetry "Y". The cam portions between two middle axial straight lines "Z" are symmetrical with respect to the axis of symmetry "Y" placed between two middle axial straight lines "Z". FIGS. 5a and 5b show two second modules placed side by side or a first central module with two half first modules placed beside.

Referring to a single second module, the auxiliary sub-needle cams 43 (symmetrical with respect to the axis of symmetry "Y") comprise a central triangular cam 111 and two side cams 112 placed on opposite sides of the central cam 111. The central triangular cam 111 and each of the side cams 112 define respective descents 113, 114 and their function is to lower the butt 22 of the sub-needle 6. FIG. 4d shows the lowering of one of the oblique sides of the central triangular cam 111 and of only one of the side cams 112 when the butt 22 of the sub-needle 6 moves in a certain direction with respect to the auxiliary sub-needle cams 43. The other oblique side of the central triangular cam 111 and the other side cam 112 operate when the movement of the butt 22 of the sub-needle 6 with respect to the auxiliary sub-needle cams 43 occurs in the opposite direction.

The sub-needle cams 39 comprise two descents 106 (whose function is shown in FIG. 4d) arranged symmetrically with respect to the axis of symmetry "Y". Here again, the two descents 106 operate alternatively depending on the sense of rotation.

The activating element paths defined by the activating element cams 42 comprise said basic path at a constant axial height and two symmetrical (with respect to the axis of symmetry "Y") pairs of ascents. Each pair comprises an upper ascent 115 and a lower ascent 116 for the activating element 8. The ascents of the two aforesaid pairs merge into a central area 117 defining a respective basically horizontal length.

The punch paths defined by the punch cams 41 have a first and a second pair of ascents which are symmetrical with respect to the axis of symmetry "Y" and which, moving down-up, merge towards said axis of symmetry "Y". Each pair of ascents comprise the drop stitch ascent 102 mentioned above and the tuck stitch ascent 101. The first pair of tuck stitch and drop stitch ascents and the second pair of tuck stitch and drop stitch ascents are associated with the respective yarn feed 110 and are symmetrical with respect to said yarn feed 110.

The two pairs operate alternatively as ascents depending on the sense of rotation. Since they are symmetrical, only one of said two pairs will be described below, which operates when the drive chain 5 rotates with respect to the actuating cams "C" around the central axis "X-X" in a counterclockwise sense of rotation "CCW".

The drop stitch ascent 102 and the tuck stitch ascent 101 branch off from the basic path located at a constant axial length, develop parallel one to the other and merge into a central area 119 aligned with the respective yarn feed 110.

In further detail, the drop stitch ascent 102 is part of drop stitch punch path developing from the basic path, rises by means of said drop stitch ascent 102, has basically horizontal length 120, which immediately follows (i.e. is placed immediately downstream from) the drop stitch ascent 102 and a successive drop stitch descent 121.

The tuck stitch ascent 101 is part of a tuck stitch punch path developing from the basic path, rises by means of said tuck stitch ascent 101 and merges with the drop stitch descent 121 on the central area 119. The tuck stitch ascent 101 and the drop stitch ascent 102 merge one into the other after (i.e. downstream from) respective maximum height points, so that the yarn feed 110 follows (i.e. is placed downstream from) respective maximum height points of the tuck stitch ascent 101 and of the drop stitch ascent 102.

Taking as reference the drive chain 5 rotating with respect to the actuating cams "C" in the counterclockwise sense of rotation "CCW" (from right to left in FIG. 5a), an inlet of the drop stitch ascent 102 circumferentially precedes an inlet of the tuck stitch ascent 101 and between the two aforesaid inlets there is no further inlet or path for the butt 25 of the punch 7. Moreover, an outlet of the drop stitch ascent 102 immediately precedes an outlet of the tuck stitch ascent 101 and between the two aforesaid outlets there is no further path for the butt 25 of the punch 7.

A maximum height, an axial extension, a circumferential extension and an overall length of the drop stitch ascent 102 are larger than the respective dimensions of the tuck stitch ascent 101.

The drop stitch punch path lies above the tuck stitch punch path and the two paths merge one into the other so as to create the central area 119.

The auxiliary selector cams 44 of a single module comprise a triangular cam 122 symmetrical with respect to the respective axis of symmetry "Y". The triangular cam 122 defines two descents operating alternatively depending on the sense of rotation of the machine 1, e.g. as shown in FIG. 4b or 4d. The auxiliary selector cams 44 further comprise a circular profile 123 (rectilinear in the planar development of FIG. 5a).

The selector paths 40 comprise a single track 124 which, in the second module considered, has a disengaging area 125 associated with the yarn feed 110 and symmetrical with respect to said yarn feed 110 and with respect to the axis of symmetry "Y". The single track 124 further comprises two wavy segment portions (with peaks and valleys), each arranged on one of the two sides of the disengaging area 125 and also symmetrical with respect to the yarn feed 110.

Taking into consideration the first module between the two axes of symmetry "Y", the two wavy segment portions constitute a wavy segment 126 placed between two successive disengaging areas 125. This wavy segment 126 is symmetrical with respect to the median axial straight line "Z".

The wavy segment 126 comprises a central protrusion 127 symmetrical with respect to the median axial straight line "Z", and two side protrusions 128 arranged on the sides of the central protrusion 127. A respective valley (or depression) is defined between the central protrusion 127 and each of the side protrusions 128.

The central protrusion 127 and the side protrusions 128 have oblique sides or segments performing various functions and symmetrical depending on the sense of rotation of the needles 3 and of the drive chains 5 with respect to the actuating cams "C".

Taking as reference the drive chain 5 rotating with respect to the actuating cams "C" around the central axis "X-X" in the counterclockwise sense of rotation "COW" (from right to left in FIG. 5a), a first one of the two sides of the central protrusion 127 (the one on the right in FIG. 5a) defines a first ascent 129 and a first one (the one on the right in FIG. 5a) of the two sides of the following side protrusion 128 defines a second ascent 100. The first ascent 129 circumferentially precedes the second ascent 100 and said two ascents 129, 100 are connected by means of a first descent 131 defined by a second one of the two sides of the central protrusion 127 (the one on the left in FIG. 5a). A second descent 132 defined by a second one (the one on the left in FIG. 5a) of the two sides of said side protrusion 128 is connected to the disengaging area 125. The first ascent 129, the first descent 131, the second ascent 100 and the second descent 132 just described work for a first yarn feed 110 following (i.e. placed downstream from) them.

The wavy segment has a basically constant axial width, such that an axial extension of the first ascent 129 is basically identical with an axial extension of the second ascent 100. Moreover, a circumferential extension of the first ascent 129 is basically identical with a circumferential extension of the second ascent 100, and the first ascent and the second ascent 129, 100 develop basically parallel one to the other.

The first ascent 129 is operatively associated to the drop stitch ascent 102 and the second ascent 100 is operatively associated to the tuck stitch ascent 101.

In particular, the first ascent 129 is circumferentially offset in advance with respect to the respective drop stitch ascent 102, such that a maximum height of the first ascent 129 circumferentially precedes the inlet of the respective drop stitch ascent 102. As can be noted, the middle axial straight line "Z" passing through the maximum height of the first ascent 129 lies just before the inlet of the respective drop stitch ascent 102.

The second ascent 100 is circumferentially offset in advance with respect to the respective tuck stitch ascent 101, such that a base of the second ascent 100 circumferentially precedes the inlet of the respective tuck stitch ascent 101 and a maximum height of the second ascent 100 circumferentially precedes a maximum height of the respective tuck stitch ascent 101.

When the machine 1 operates in the opposite sense of rotation, i.e. in a second sense of rotation or clockwise "CW" (shown in FIG. 5b), the second one of the two sides of the central protrusion 127 (the one on the left in FIG. 5b) defines the first ascent 129 and the first one of the two sides (the one on the right in FIG. 5b) defines the first descent 131. The other one of the side protrusions 128 defines the second ascent 100 (second side) and the second descent 132 (first side). Said first ascent and first descent, second ascent and second descent work for a second yarn feed 110 and in cooperation with the pair of drop stitch ascent 102 and tuck stitch ascent 101 placed immediately after (i.e. downstream).

More generally, the wavy segment 126 placed between two successive yarn feeds 110 works for the one of the two yarn feeds 110 following (i.e. remains downstream from) the wavy segment 126 depending on the sense of rotation. By reversing the sense of rotation, the same wavy segment 126 works for the other yarn feed 110.

The disengaging area 125 has two outlet ramps 133 placed on opposite ends thereof. Each outlet ramp 133 extends between a bottom surface of the single track 124 and a radially more external surface so as to serve as connection. This ramp 133 is better shown in FIG. 6.

FIGS. 5a and 5b further schematically show the selecting device 200 lying between two successive yarn feeds 110 or on a respective wavy segment 126. The selecting device 200 comprises two actuators 201, 202 circumferentially placed side by side and located in a respective valley (or depression) defined by the wavy segment 126, between the central protrusion 127 and each of the side protrusions 128.

Each actuator 201, 202 shows is of piezoelectric type with levers.

In the embodiment shown in FIGS. 7 and 8, the actuator 201, 202 comprises a first array of levers 203 and a second array of levers 204 projecting from a front face of the actuator 201, 202 facing, when the actuator 201, 202 is mounted onto the machine 1 in operating position, the needle-holding cylinder 2 and the radial teeth 35 of the selector 9. Each array of levers 203, 204 comprises a plurality of levers 205, 206 overlapping and aligned along a respective common vertical axis "K-K" and the second array of levers 204 axially overlaps the first array of levers 203. Preferably, the two array of levers 203, 204 are arranged along the same common vertical axis "K-K" and are placed one over the other.

As can be better seen in FIG. 8, each lever 205, 206 has an asymmetrical shape with respect to a plane of symmetry "W-W" in which said common vertical axis "K-K" lies. The levers 205 of the first array 203 are asymmetrical with respect to the levers 206 of the second array 204.

Each of the levers 205, 206 is oscillating, by means of a piezoelectric control managed by a control unit of the machine 1, around a respective horizontal axis orthogonal to the common axis, between a first raised position and a second lowered position. By means of said oscillation, the tooth of the lever 205, 206 is raised and/or lowered (arrows "F" of FIG. 7) and interacts with a respective tooth 35 of the selector 9 so as to cause the oscillation of the axially stationary element 34 and, as a result, the oscillation of the axially moving element 33. As can be seen in FIGS. 7 and 8, the levers 205, 206 of the first and second array of levers 203, 204 have respective first and second engaging surfaces 401, 402 configured for contacting the teeth 35 of the selector 9. In the embodiment shown, the first engaging surfaces 401 lie in a first common plan inclined with respect to the plane of symmetry "W-W", the second engaging surfaces 402 lie in a second common plane inclined with respect to said plane of symmetry "W-W", and said first common plane, second common plane and plane of symmetry "W-W" intersect on an intersection line parallel to the common vertical axis "K-K". As a result, the first engaging surfaces 401 and the second engaging surfaces 402 are inclined towards opposite sides of the plane of symmetry "W-W".

In other embodiments, not shown, the first engaging surfaces 401 lie in a plurality of first inclined planes and the second engaging surfaces 402 lie in a plurality of second inclines planes. Said first and second planes are inclined towards opposite sides of the plane of symmetry "W-W" and delimit different angles with said plane of symmetry "W-W".

In the embodiment shown, the levers 205 of the first array of levers 203 are all movable together around the respective horizontal axes and the levers 206 of the second array of levers 204 are all movable together around the respective horizontal axes, and the two arrays are movable independently.

As shall appear from the following explanation, the first array of levers 203 is configured for operating, i.e. for engaging with teeth 35 of the selectors 9 of the machine 1, if the relative rotation of the needle-holding cylinder 2 with respect to the actuating cams "C" occurs in counterclockwise sense "COW", and the second array of levers 204 is configured for operating, i.e. for engaging with teeth 35 of the selectors 9 of the machine 1, if the relative rotation of the needle-holding cylinder 2 with respect to the actuating cams "C" occurs in clockwise sense "CW".

Depending on and in accordance with the method for moving the needles 3 according to the present invention, in order to make a drop stitch with the movements of the needles 3 and of the drive chain 5 shown in FIG. 4b, the axially stationary element 34 of the selector 9 provided with the radial teeth 35 moves before the first and second actuator 201, 202 in the counterclockwise sense of rotation "COW".

The first array of levers 203 of the first actuator 201 acts upon the axially stationary element 34 for causing the oscillation of the axially moving element 33 and the engagement of the butt 37 in a first inlet point 300 of the single track 124 placed in a valley (or depression) of the wavy segment at the base of the first ascent 129 (FIGS. 4b and 5a). The relative rotation between the actuating cams "C" and the needle-holding cylinder 2 causes the butt 37 to slide in the single track 124 and on the first ascent 129. The axially moving element 33 of the selector 9 is lifted upwards and pushes upwards the punch 7 until the butt 25 of the punch 7 is engaged into the drop stitch ascent 102 (FIGS. 4b and 5a).

The punch 7 rises further and disconnects from the axially moving element 33 of the selector 9 thanks to the respective butt 25 sliding on the drop stitch ascent 102, as far as the respective maximum height point placed on the basically horizontal length 120, and lifts the needle 3 so as to make the drop stitch. Then, the butt 25 of the punch 7 goes over the drop stitch descent 121 and the central area 119 and gets down again going over the ascent 101 (which in this step works as a descent) of the other pair (FIG. 4b).

While the punch 7 is lifted and slides on the drop stitch ascent 102 and then gets down again, the butt 37 of the axially moving element 33 of the selector 9 moves along the single track 124 going sequentially over the first descent 131, the second ascent 100, the second descent 132 and getting into the disengaging area 125 (FIG. 4b). While moving on, the butt 37 of the axially moving element 33 of the selector 9 meets the outlet ramp 133 which pushes radially inwards said butt 37 and disengage it from the single track 124 (FIG. 4b). The butt 37 of the selector 8 gets out of the single track 124 and then into the respective groove of the needle-holding cylinder 2.

In order to make a tuck stitch with the movements of the needles 3 and of the drive chain 5 shown in FIG. 4a, the first array of levers 203 of the second actuator 202 acts upon the axially stationary element 34 for causing the oscillation of the axially moving element 33 and the engagement of the butt 37 in a second inlet point 301 of the single track 124 placed in a valley (or depression) of the wavy segment at the base of the second ascent 100 (FIGS. 4a and 5a).

The relative rotation between the actuating cams "C" and the needle-holding cylinder 2 causes the butt 37 to slide on the second ascent 100, the axially moving element 33 of the selector 9 is lifted upwards and pushed upwards the punch 7 until the butt 25 of the punch 7 is engaged into the tuck stitch ascent 101 (FIGS. 4a and 5a).

The punch 7 rises further thanks to the respective butt 25 sliding on the tuck stitch ascent 101, as far as the respective maximum height point placed on the central area 119, and lifts the needle 3 so as to make the tuck stitch. Then, the butt 25 of the punch 7 goes over the central area 119 and gets down again going over the ascent 101 (which in this step works as a descent) of the other pair (FIG. 4a).

While the punch 7 is lifted and slides on the tuck stitch ascent 101 and then gets down again, the butt 37 of the axially moving element 33 of the selector 9 moves along the single track 124 going sequentially over the second descent 132 and getting into the disengaging area 125 (FIG. 4a) so as to later engage the outlet ramp 133 pushing radially inwards said butt 37 and disengages it from the single track 124 (FIG. 4a). The butt 37 of the selector 9 gets out of the single track 124 and then into the respective groove of the needle-holding cylinder 2. If the sense of rotation is clockwise "CW" as shown in FIG. 5b, the second array of levers 204 of the second actuator 202 acts upon the axially stationary element 34 for causing the oscillation of the axially moving element 33 and the engagement of the butt 37 into a first inlet point 300 (so as to make a drop stitch) placed at the base of the first ascent 129, and the second array of levers 204 of the first actuator 201 acts upon the axially stationary element 34 for causing the oscillation of the axially movement element 33 and the engagement of the butt 37 into a second inlet point 301 (so as to make a tuck stitch) placed at the base of the second ascent 100 (FIG. 5b).

As can be noted, the two sides of the central protrusion 127 reverse their function (first side—first ascent 129, second side—first descent 131; first side—first descent 131, second side—first ascent 129) when the sense of rotation is reversed.

More generally, if the needle-holding cylinder 2 rotates in the counterclockwise sense of rotation "COW" with respect to the actuating cams "C" (FIG. 5a), the butt 37 of the selector 9 slides on the first side of the central protrusion 127 for lifting the punch 7 until the butt 25 of the punch 7 is engaged into the drop stitch ascent 102 related to a first yarn feed 110. As an alternative, the butt 37 of the selector 9 slides on the first side of one of the side protrusions 128 so as to lift the punch 7 until the butt 25 of the punch 7 is engaged into the tuck stitch ascent 101 related to the first yarn feed 110. Moreover, the first array of levers 203 of the first actuator 201 acts upon the selectors 9 for engaging the butts 37 into the first inlet point 300 and make drop stitches on said first yarn feed 110, and the first array of levers 203 of the second actuator 202 acts upon the selectors 9 for engaging the butts 37, previously not engaged by the first actuator 201, into the second inlet point 301 and make tuck stitches on said yarn feed 110.

If the needle-holding cylinder 2 rotates in the clockwise sense of rotation "CW" with respect to the actuating cams "C" (FIG. 5b), the butt 37 of the selector 9 slides on the second side of the central protrusion 127 for lifting the punch 7 until the butt 25 of the punch 7 is engaged into the drop stitch ascent 102 related to a second yarn feed 110. As an alternative, the butt 37 of the selector 9 slides on the second side of the other one of the side protrusions 128 so as to lift the punch 7 until the butt 25 of the punch 7 is engaged into the tuck stitch ascent 101 related to the second yarn feed 110. Moreover, the second array of levers 204 of the first actuator 201 acts upon the selectors 9 for engaging the butts 37 into the first inlet point 301 and make tuck stitches on a different, adjacent yarn feed 110, and a second array of levers 204 of the second actuator 202 acts upon the selectors 9 for engaging the butts 37 into the first inlet point 300 and make drop stitches on said different, adjacent yarn feed 110.

The invention achieves important advantages.

First of all, the invention allows to overcome the drawbacks of prior art.

In particular, the invention allows to produce circular machines operating in one sense of rotation only or operating with alternating oscillatory motion, which:
- are very compact both in axial and radial direction;
- can manufacture tubular fabrics with small radial size, even below 165 mm;
- have less stringent restraints on the needle movements to be obtained so as to manufacture even complex fabrics;
- are more compact than known machines, though allowing to obtain the same number of needle movements as bulkier machines or even more complex movements;
- have a higher (even double) number of "feeds", i.e. yarn feeding points, with respect to the prior art and with the same cylinder diameter;
- can execute "intarsia" designs, i.e. motifs in color without floated yarns on the reverse;
- can manufacture three-dimensional textile articles without necessarily varying the knitting density and without requiring the addition of course portions with yarn shearing.

The invention claimed is:
1. A circular knitting machine, comprising:
a needle-holding cylinder having a plurality of longitudinal grooves arranged around a central axis of the needle-holding cylinder;
a plurality of needles, each being housed in a respective longitudinal groove;
at least one yarn feed operatively associated to the needles;
actuating cams arranged around the needle-holding cylinder and movable with respect to said needle-holding cylinder around the central axis for causing or allowing the movement of the needles along the longitudinal grooves so as to enable stitch formation by said needles;
a drive chain for each needle inserted into the respective longitudinal groove, located below the respective needle and operatively placed between the respective needle and said actuating cams;
wherein said drive chain comprises:
a sub-needle arranged below the needle;
a selector arranged below the sub-needle having at least one respective butt radially movable between an operating position, in which it is extracted so as to engage with respective selector paths defined by selector cams, and a non-operating position, in which it is retracted so as not to engage with said selector paths;
at least one selecting device acting under control upon said selector for switching the latter into or retaining it in the operating position or the non-operating position;
a punch arranged between the sub-needle and the selector, wherein a lower portion of the punch is engaged with the selector and an upper portion of the punch is engaged with the sub-needle, wherein the punch has a respective butt which can be engaged with respective punch-paths defined by punch cams;
wherein, taking as reference the drive chain which is configured to rotate with respect to the actuating cams around the central axis in a sense of rotation, the punch-paths comprise a tuck stitch ascent and a drop stitch ascent for each yarn feed, and wherein an inlet of the drop stitch ascent is adapted to circumferentially precede an inlet of the tuck stitch ascent; wherein the selector paths comprise a single track defining a first ascent and a second ascent placed in succession one after the other for each yarn feed; wherein the first ascent is adapted to circumferentially precede the second ascent; wherein the first ascent is operatively associated to the drop stitch ascent and the second ascent is operatively associated to the tuck stitch ascent.

2. The machine according to claim 1, wherein an inlet of the drop stitch ascent is adapted to immediately precede an inlet of the tuck stitch ascent.

3. The machine according to claim 1, wherein the tuck stitch ascent and the drop stitch ascent merge one into the other after respective maximum height points.

4. The machine according to claim 1, wherein the single track has at least one wavy segment with peaks and valleys, and wherein said wavy segment comprises the first ascent and the second ascent; wherein the wavy segment comprises a first descent, wherein the first descent connects the first ascent to the second ascent; wherein the wavy segment comprises a second descent following the second ascent; wherein inlet points of the butt of the selector in the wavy segment are defined on a base of the first ascent and on a base of the second ascent.

5. The machine according to claim 4, wherein the single track has a disengaging area for each yarn feed; wherein the disengaging area follows the second descent and is configured for enabling the respective butt to radially get out from said single track.

6. The machine according to claim 5, wherein said disengaging area has at least one outlet ramp extending between a bottom surface of the single track and a radially more external surface.

7. The machine according to claim 1, wherein an axial extension of the first ascent is basically the same as an axial extension of the second ascent; wherein a circumferential extension of the first ascent is basically the same as a circumferential extension of the second ascent.

8. The machine according to claim 1, wherein the first ascent is circumferentially offset in advance with respect to the respective drop stitch ascent, and the second ascent is circumferentially offset in advance with respect to the respective tuck stitch ascent.

9. The machine according to claim 1, wherein a maximum height of the first ascent is adapted to circumferentially precede an inlet of the respective drop stitch ascent; wherein a base of the second ascent is adapted to circumferentially precede an inlet of the respective tuck stitch ascent; wherein a maximum height of the second ascent is adapted to circumferentially precede a maximum height of the respective tuck stitch ascent.

10. The machine according to claim 1, wherein the yarn feed follows respective maximum height points of the tuck stitch ascent and of the drop stitch ascent.

11. The machine according to claim 1, comprising at least two yarn feeds, wherein the single track comprises a disengaging area associated with each yarn feed and at least two wavy segments, each being placed between two disengaging areas one circumferentially after the other.

12. The machine according to claim 11, wherein the disengaging area is symmetrical with respect to the respective yarn feed; wherein the wavy segment is symmetrical with respect to a middle axial straight line located in an intermediate position between two yarn feeds one circumferentially after the other; wherein the disengaging area has two outlet ramps placed on opposite ends thereof.

13. The machine according to claim 11, wherein the wavy segment comprises a central protrusion symmetrical with respect to the middle axial straight line and two side protrusions; wherein a valley is defined between the central protrusion and two side protrusions.

14. The machine according to claim 11, wherein the punch paths comprise a first pair of tuck stitch and drop stitch ascents and a second pair of tuck stitch and drop ascents coupled to each yarn feed and arranged symmetrically with respect to said yarn feed; wherein the tuck stitch and drop stitch ascents of the first and second pair merge into a central area of the punch paths aligned with the respective yarn feed.

15. The machine according to claim 1, wherein said at least one selecting device comprises two actuators circumferentially placed one beside the other and located between two successive yarn feeds; wherein each of the actuators is placed on a respective valley defined by the wavy segment.

16. The machine according to claim 1, wherein the actuator comprises a first array of levers and a second array of levers axially overlapping the first array of levers; wherein the first array of levers is configured for operating if the relative rotation of the needle-holding cylinder with respect to the actuating cams occurs in counterclockwise sense; wherein the second array of levers is configured for operating if the relative rotation of the needle-holding cylinder with respect to the actuating cams occurs in clockwise sense.

17. A method for moving the needles of a circular knitting machine, wherein said machine is in accordance with claim 1, comprising the steps of:
  causing a relative rotation between the needle-holding cylinder and the actuating cams;
  wherein the following steps are provided for:
    engaging the butt of the selector into a first inlet point defined on a base of the first ascent;
    lifting the selector by means of said relative rotation and a subsequent sliding of the respective butt on the first ascent;
    lifting the punch by means of an axial push upwards made by the selector until the butt of the punch is engaged into the drop stitch ascent;
    further lifting the punch by means of said relative rotation and a subsequent sliding of the respective butt on the drop stitch ascent so as to lift the needle and make a drop stitch;
  wherein the punch, while being lifted, gets off the selector;
  wherein, while the punch is lifted and slides on the drop stitch ascent, the butt of the selector moves in the single track also going over the second ascent;
  or the following steps are provided for:
    engaging the butt of the selector into a second inlet point defined on a base of the second ascent;
    causing the selector to be lifted by means of said relative rotation and a subsequent sliding of the respective butt on the second ascent;
    lifting the punch by means of an axial push upwards made by the selector until the butt of the punch is engaged into the tuck stitch ascent;
    causing the punch to be further lifted by means of said relative rotation and a subsequent sliding of the respective butt on the tuck stitch ascent so as to lift the needle and make a tuck stitch.

18. The method according to claim 17, wherein, after going over the second ascent, the butt of the selector goes over a second descent and gets into a disengaging area; wherein the butt of the selector goes over the disengaging area until it engages an outlet ramp, wherein the outlet ramp causes the respective butt to radially get out of the single track.

19. The method according to claim 17, wherein, if the needle-holding cylinder rotates in a counterclockwise sense of rotation with respect to the actuating cams, the butt of the selector slides on the first side of the central protrusion so as to lift the punch until the butt of the punch is engaged into the drop stitch ascent related to a first yarn feed or the butt of the selector slides on the first side of one of the side protrusions so as to lift the punch until the butt of the punch is engaged into the tuck stitch ascent related to the first yarn feed; wherein, if the needle-holding cylinder rotates in a clockwise sense of rotation with respect to the actuating cams, the butt of the selector slides on the second side of the central protrusion so as to lift the punch until the butt of the punch is engaged into the drop stitch ascent related to a second yarn feed or the butt of the selector slides on the second side of another one of the side protrusions so as to lift the punch until the butt of the punch is engaged into the tuck stitch ascent related to the second yarn feed.

20. The method according to claim 19, wherein, if the needle-holding cylinder rotates in a counterclockwise sense of rotation with respect to the actuating cams, a first array of levers of a first actuator acts upon the selectors for engaging the butts into the first inlet point and making drop stitches on a yarn feed, and a first array of levers of a second actuator acts upon the selectors for engaging the butts into the second inlet point and making tuck stitches on said yarn feed; wherein, if the needle-holding cylinder rotates in a clockwise sense of rotation with respect to the actuating cams, a second array of levers of the second actuator acts upon the selectors for engaging the butts into the first inlet point and making drop stitches on a different, adjacent yarn feed, and a second array of levers of the first actuator acts upon the selectors for engaging the butts into the second inlet point and making tuck stitches on said different, adjacent yarn feed.

* * * * *